(12) United States Patent
Lee et al.

(10) Patent No.: US 10,847,827 B2
(45) Date of Patent: Nov. 24, 2020

(54) ION CONDUCTOR, METHOD FOR PREPARING SAME, AND ION-EXCHANGE MEMBRANE, MEMBRANE-ELECTRODE ASSEMBLY AND FUEL CELL COMPRISING SAME

(71) Applicant: KOLON INDUSTRIES, INC., Gwacheon-si (KR)

(72) Inventors: Dong Hoon Lee, Yongin-si (KR); Na Young Kim, Yongin-si (KR); Seung Jib Yum, Yongin-si (KR); Eun Su Lee, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 206 days.

(21) Appl. No.: 15/763,612

(22) PCT Filed: Sep. 30, 2016

(86) PCT No.: PCT/KR2016/011016
§ 371 (c)(1),
(2) Date: Mar. 27, 2018

(87) PCT Pub. No.: WO2017/057974
PCT Pub. Date: Apr. 6, 2017

(65) Prior Publication Data
US 2018/0277873 A1    Sep. 27, 2018

(30) Foreign Application Priority Data

Sep. 30, 2015 (KR) .................. 10-2015-0137633
Sep. 30, 2016 (KR) .................. 10-2016-0126501

(51) Int. Cl.
*H01M 8/10* (2016.01)
*H01M 8/1032* (2016.01)
(Continued)

(52) U.S. Cl.
CPC ............ *H01M 8/1032* (2013.01); *C08G 8/02* (2013.01); *C08G 65/4056* (2013.01);
(Continued)

(58) Field of Classification Search
CPC .......... C08G 8/02; C08G 75/23; C08G 65/40; C08G 65/4056; C08G 65/4012; C08G 65/4031
See application file for complete search history.

(56) References Cited

U.S. PATENT DOCUMENTS

| | | | |
|---|---|---|---|
| 4,889,909 A | 12/1989 | Besecke et al. | |
| 8,431,676 B2* | 4/2013 | Yamakawa | ............. C07C 45/71 528/125 |
| 2013/0245223 A1* | 9/2013 | Steiger | ............... C08G 65/4056 528/174 |

FOREIGN PATENT DOCUMENTS

| | | |
|---|---|---|
| CN | 101388466 A | 3/2009 |
| CN | 104530682 A | 4/2015 |

(Continued)

OTHER PUBLICATIONS

Machine translation of KR 101338588 (no date).*
(Continued)

*Primary Examiner* — Amanda C. Walke
(74) *Attorney, Agent, or Firm* — Harvest IP Law, LLP

(57) ABSTRACT

The present invention relates to an ion conductor, a method for producing the same, and an ion exchange membrane, a polymer electrolyte membrane and a fuel cell including the same. The ion conductor includes a repeat unit represented by the following Formula 1, and a repeat unit represented by the following Formula 2 or a repeat unit represented by the following Formula 5. Formulae 1, 2 and 3 are described as in the Detailed Description of the Invention.
The ion conductor contains a hydrocarbon-based block copolymer which has an easily changeable structure because
(Continued)

it includes a hydrophilic region and a hydrophobic region, wherein characteristics of the block copolymer and the ion conductor can be easily regulated through control over the structure of the hydrophilic region and the hydrophobic region, and ion conductivity and durability of the ion conductor are improved within the whole humidity range through micro-phase separation between the hydrophilic region and the hydrophobic region which are structurally controlled.

10 Claims, 3 Drawing Sheets

(51) Int. Cl.
    *C08G 75/23*     (2006.01)
    *C08J 5/22*     (2006.01)
    *H01M 8/1072*     (2016.01)
    *H01M 8/1027*     (2016.01)
    *H01M 8/1004*     (2016.01)
    *C08G 65/40*     (2006.01)
    *C08G 8/02*     (2006.01)
    *H01M 8/1018*     (2016.01)

(52) U.S. Cl.
    CPC ............ *C08G 75/23* (2013.01); *C08J 5/2256* (2013.01); *H01M 8/1004* (2013.01); *H01M 8/1027* (2013.01); *H01M 8/1072* (2013.01); *C08J 2381/06* (2013.01); *H01M 2008/1095* (2013.01); *H01M 2300/0082* (2013.01)

(56) References Cited

FOREIGN PATENT DOCUMENTS

| | | | |
|---|---|---|---|
| JP | 09-202824 | A | 8/1997 |
| JP | 2006-172861 | A | 6/2006 |
| JP | 2007-26888 | A | 2/2007 |
| JP | 2007-66882 | A | 3/2007 |
| JP | 2007-291242 | A | 11/2007 |
| JP | 2008-543001 | A | 11/2008 |
| JP | 2010-31231 | A | 2/2010 |
| JP | 2013-503436 | A | 1/2013 |
| JP | 2014-098137 | A | 5/2014 |
| JP | 2014098137 | A * | 5/2014 |
| KR | 10-2006-0083372 | A | 7/2006 |
| KR | 10-0660573 | B1 | 12/2006 |
| KR | 10-0884959 | B1 | 2/2009 |
| KR | 10-2011-0120185 | A | 11/2011 |
| KR | 10-1208314 | B1 | 12/2012 |
| KR | 10-1267905 | B1 | 5/2013 |
| KR | 10-1338588 | B1 | 12/2013 |
| KR | 10-1376362 | B1 | 3/2014 |
| KR | 10-1736533 | B1 | 5/2017 |

OTHER PUBLICATIONS

Machine translation of JP2014-098137 (no date).*
International Search Report of PCT/KR2016/011016 dated Jan. 9, 2017.
Japan Patent Office; Communication dated Mar. 5, 2019 in counterpart application No. 2018-515990.

* cited by examiner

[Fig. 1]
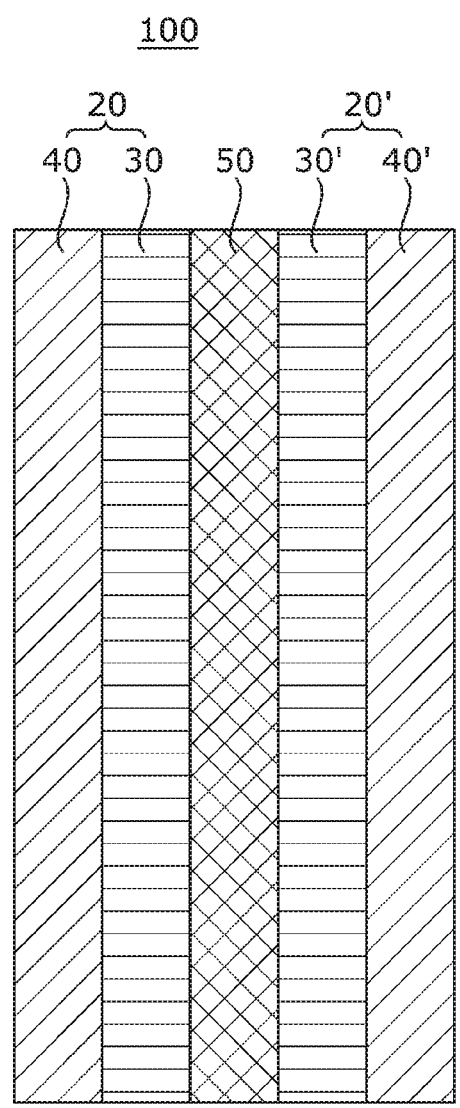

[Fig. 2]
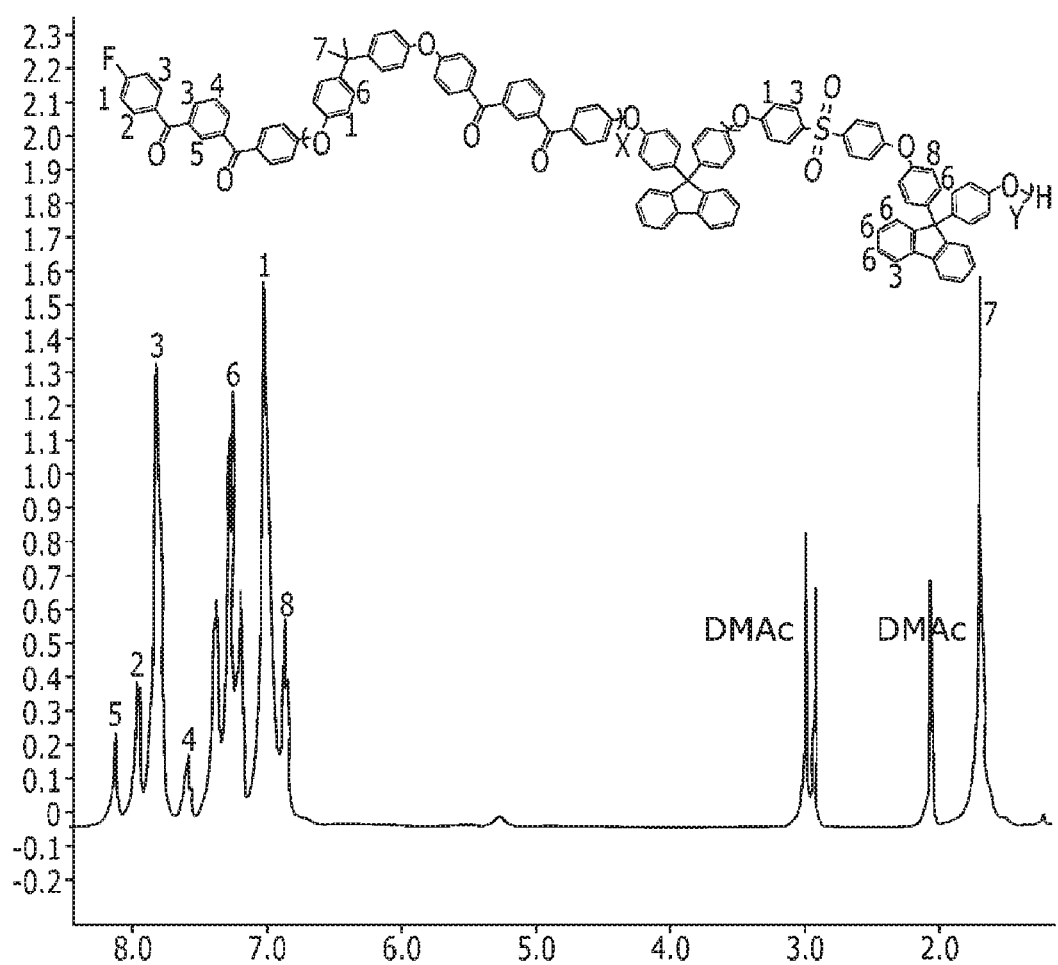

[Fig. 3]
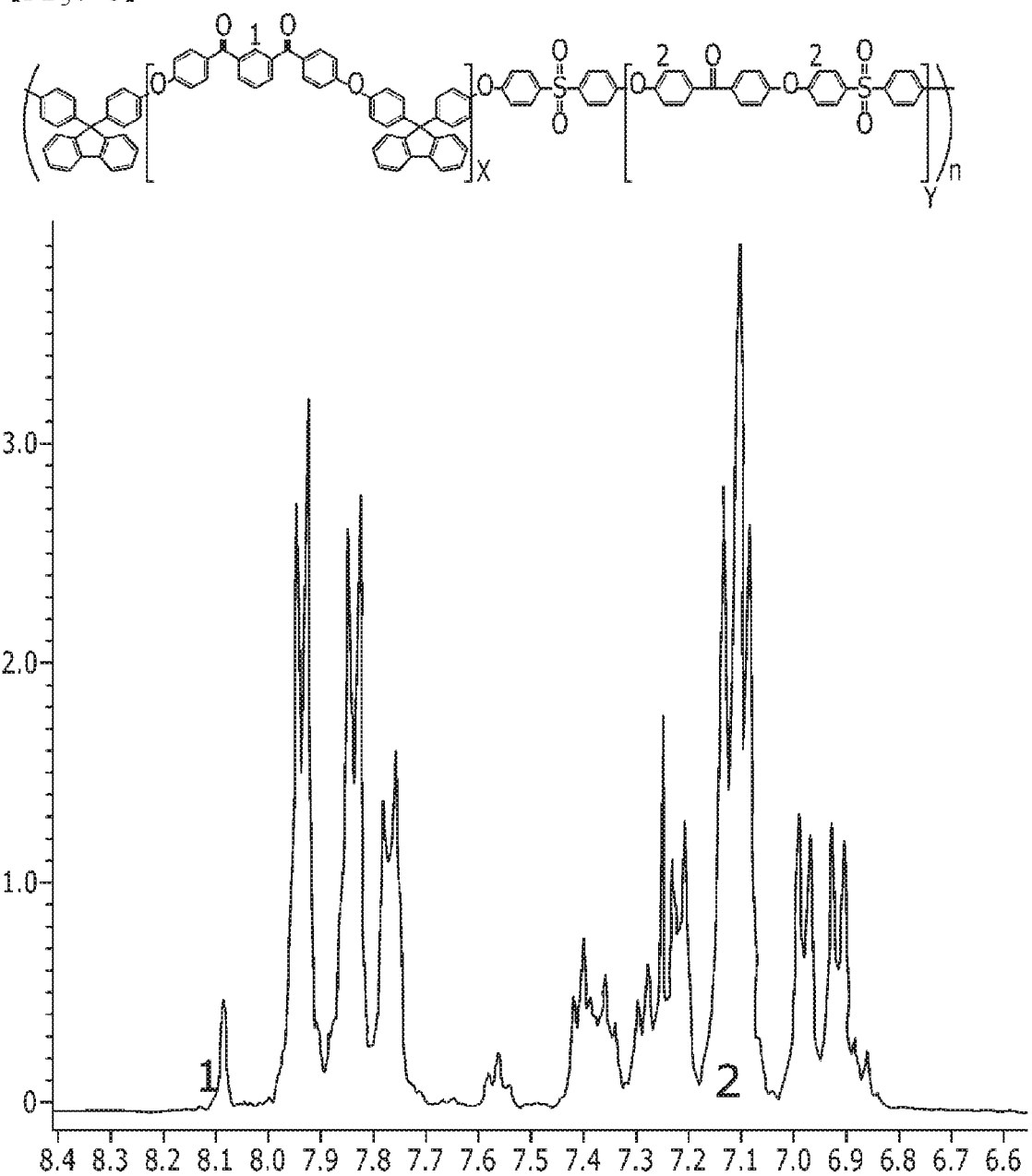

ION CONDUCTOR, METHOD FOR PREPARING SAME, AND ION-EXCHANGE MEMBRANE, MEMBRANE-ELECTRODE ASSEMBLY AND FUEL CELL COMPRISING SAME

CROSS REFERENCE TO RELATED APPLICATIONS

This application is a National Stage of International Application No. PCT/KR2016/011016 filed Sep. 30, 2016, claiming priority based on Korean Patent Application No. 10-2015-0137633 filed Sep. 30, 2015 and Korean Patent Application No. 10-2016-0126501 filed Sep. 30, 2016.

TECHNICAL FIELD

The present invention relates to an ion conductor, a method for producing the same, and an ion exchange membrane, a polymer electrolyte membrane and a fuel cell including the same. More particularly, the present invention relates to an ion conductor that contains a hydrocarbon-based block copolymer which includes a hydrophilic region and a hydrophobic region, and thereby has an easily changeable structure, wherein characteristics of the block copolymer and the ion conductor can be easily regulated through control over the structure of the hydrophilic region and the hydrophobic region, and ion conductivity and durability of the ion conductor are improved within the whole humidity range through micro-phase separation between the hydrophilic region and the hydrophobic region which are structurally controlled, a method for producing the same, and an ion exchange membrane, a polymer electrolyte membrane and a fuel cell including the same.

BACKGROUND ART

A fuel cell, which is a cell that directly converts chemical energy generated by oxidation of a fuel into electrical energy, attracts much attention as a next-generation energy source owing to high energy efficiency and high eco-friendliness based on less contaminant exhaust.

In general, the fuel cell has a structure in which an oxidation electrode (anode) and a reduction electrode (cathode) are opposite to each other via an electrolyte membrane and such a structure is referred to as a "membrane electrode assembly (MEA)".

Depending on the type of electrolyte membrane, the fuel cell is classified into an alkaline electrolyte fuel cell, a direct oxidation fuel cell, a polymer electrolyte membrane fuel cell (PEMFC) and the like. Among them, the polymer electrolyte fuel cell comes into the spotlight for portable, vehicle and household power generation applications due to advantages such as low operation temperature of less than 100° C., rapid starting and response speeds and excellent durability.

Representative examples of the polymer electrolyte fuel cell include a proton exchange membrane fuel cell (PEMFC) using a hydrogen gas as a fuel, and the like.

An overall reaction occurring in the polymer electrolyte fuel cell will be described in brief. First, when a fuel such as hydrogen gas is fed to the anode, hydrogen is oxidized at the anode to produce a hydrogen ion ($H^+$) and an electron ($e^-$). The produced hydrogen ion ($H^+$) is transferred to the cathode via the polymer electrolyte membrane, whereas the produced electron ($e^-$) is transferred to the cathode via an exterior circuit. When oxygen is fed to the cathode, the oxygen binds to the hydrogen ion ($H^+$) and electron ($e^-$), and is thus reduced, to produce water.

Since the polymer electrolyte membrane serves as a channel, allowing the hydrogen ion ($H^+$) produced at the anode to be transferred to the cathode, it should be basically capable of conducing hydrogen ions ($H^+$) well. In addition, the polymer electrolyte membrane should be efficiently capable of separating the hydrogen gas fed to the anode from the oxygen fed to the cathode, and requires excellent mechanical strength, dimensional stability and chemical resistance, as well as low ohmic loss at a high current density.

Currently used polymer electrolyte membranes include fluoride-based resins, more specifically, perfluorosulfonic acid resins (hereinafter, referred to as "fluoride ion conductors"). However, fluoride ion conductors have a problem in that pinholes are generated due to weak mechanical strength when used for a long time and energy conversion efficiency is thus deteriorated. In an attempt to reinforce mechanical strength, the thickness of the fluoride ion conductor was increased. In this case, however, there are problems in that ohmic loss is increased, use of expensive materials is also increased and economic efficiency is thus deteriorated.

In order to solve these drawbacks of the fluoride ion conductors, recently, hydrocarbon-based ion conductors are actively developed. However, because the polymer electrolyte membrane repeatedly expands and contracts under humid/dry conditions which are operation conditions of the fuel cell, hydrocarbon-based polymer electrolyte membranes structurally having a high moisture content have drawbacks of low long-term durability due to low dimensional stability and tensile strength.

Accordingly, in an attempt to secure durability of hydrocarbon-based ion conductors, technologies are being developed to improve durability of ion conductors through changes in chemical structure or the like.

PRIOR ART DOCUMENT

Patent Document (Patent Document 1) Korean Patent Laid-open Publication No. 2006-0083374 (published on 2006 Jul. 20)
(Patent Document 2) Korean Patent Laid-open Publication No. 2006-0083372 (published on 2006 Jul. 20)
(Patent Document 3) Korean Patent Laid-open Publication No. 2011-0120185 (published on 2011 Nov. 3)

DISCLOSURE

Technical Problem

Therefore, it is one object of the present invention to provide an ion conductor that contains a hydrocarbon-based block copolymer which includes a hydrophilic region and a hydrophobic region, and thereby has an easily changeable structure, wherein characteristics of the block copolymer and the ion conductor can be easily regulated through control over the structure of the hydrophilic region and the hydrophobic region, and ion conductivity and durability of the ion conductor are improved within the whole humidity range through micro-phase separation between the hydrophilic region and the hydrophobic region which are structurally controlled.

It is another object of the present invention to provide a method for producing the ion conductor.

It is another object of the present invention to provide an ion exchange membrane including the ion conductor.

It is another object of the present invention to provide a polymer electrolyte membrane including the ion exchange membrane.

It is yet another object of the present invention to provide a fuel cell including the polymer electrolyte membrane.

Technical Solution

In accordance with an aspect of the present invention, the above and other objects can be accomplished by the provision of an ion conductor including a repeat unit represented by the following Formula 1, and a repeat unit represented by the following Formula 2 or a repeat unit represented by the following Formula 5:

[Formula 1]

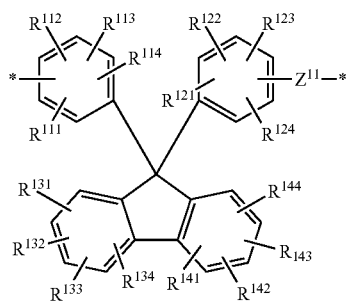

wherein $R^{111}$ to $R^{114}$, $R^{121}$ to $R^{124}$, $R^{131}$ to $R^{134}$ and $R^{141}$ to $R^{144}$ each independently represent any one selected from the group consisting of: a hydrogen atom; a halogen atom; an ion-conducting group; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group; and $Z^{11}$ represents —O— or —S—,

[Formula 2]

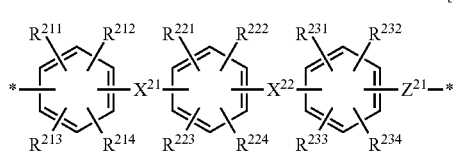

wherein $R^{211}$ to $R^{214}$, $R^{221}$ to $R^{224}$ and $R^{231}$ to $R^{234}$ each independently represent any one selected from the group consisting of: a hydrogen atom; a halogen atom; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group;

$X^{21}$ and $X^{22}$ each independently represent any divalent organic group selected from the group consisting of a single bond, —CO—, —SO$_2$—, —CONH—, —COO—, —CR'$_2$—, —C(CH$_3$)$_2$—, —C(CF$_3$)$_2$— and —(CH$_2$)$_n$—, in which R' each independently represents any one selected from the group consisting of a hydrogen atom, a halogen atom, an alkyl group and a halogenated alkyl group, and n represents an integer of 1 to 10; and $Z^{21}$ represents —O— or —S—,

[Formula 5]

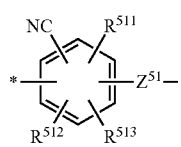

wherein $R^{511}$ to $R^{513}$ each independently represent any one selected from the group consisting of: a hydrogen atom; a halogen atom; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group; and $Z^{51}$ is —O— or —S—.

The ion conductor may include a first repeat unit including the repeat unit represented by Formula 1, and a second repeat unit including the repeat unit represented by Formula 2 or a third repeat unit including the repeat unit represented by Formula 5.

The first repeat unit may be represented by the following Formula 3:

[Formula 3]

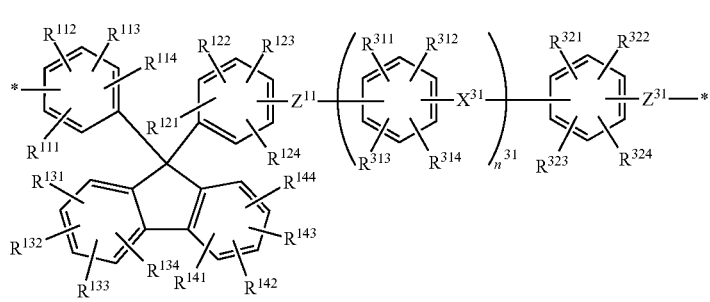

wherein $R^{111}$ to $R^{114}$, $R^{121}$ to $R^{124}$, $R^{131}$ to $R^{134}$, $R^{141}$ to $R^{144}$, $R^{311}$ to $R^{314}$ and $R^{321}$ to $R^{324}$ each independently represent any one selected from the group consisting of: a hydrogen atom; a halogen atom; an ion-conducting group; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group;

$X^{31}$ represents any divalent organic group selected from the group consisting of a single bond, —CO—, —SO$_2$—, —CONH—, —COO—, —CR'$_2$—, —(CH$_2$)$_n$—, a cyclohexylidene group, a cyclohexylidene group including an ion-conducting group, a fluorenylidene group, a fluorenylidene group including an ion-conducting group, —C(CH$_3$)$_2$—, —C(CF$_3$)$_2$—, —O— and —S—, in which R' represents any one selected from the group consisting of a hydrogen atom, a halogen atom, an alkyl group and a halogenated alkyl group and n represents an integer of 1 to 10;

$Z^{11}$ and $Z^{31}$ each independently represent —O— or —S—; and $n^{31}$ represents an integer of 0 to 10.

The second repeat unit may be represented by the following Formula 4:

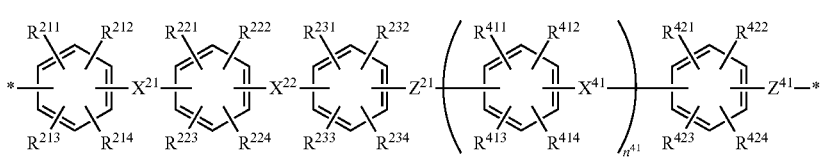

[Formula 4]

wherein $R^{211}$ to $R^{214}$, $R^{221}$ to $R^{224}$, $R^{231}$ to $R^{234}$, $R^{411}$ to $R^{414}$ and $R^{421}$ to $R^{424}$ each independently represent any one selected from the group consisting of: a hydrogen atom; a halogen atom; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group;

$X^{21}$ and $X^{22}$ each independently represent any divalent organic group selected from the group consisting of a single bond, —CO—, —SO$_2$—, —CONH—, —COO—, —CR'$_2$—, —C(CH$_3$)$_2$—, —C(CF$_3$)$_2$— and —(CH$_2$)$_n$—, in which R' represents any one selected from the group consisting of a hydrogen atom, a halogen atom, an alkyl group and a halogenated alkyl group, and n represents an integer of 1 to 10;

$X^{41}$ represents any divalent organic group selected from the group consisting of a single bond, —CO—, —SO$_2$—, —CONH—, —COO—, —CR'$_2$—, —(CH$_2$)$_n$—, a cyclohexylidene group, a fluorenylidene group, —C(CH$_3$)$_2$—, —C(CF$_3$)$_2$—, —O— and —S—, in which R' represents any one selected from the group consisting of a hydrogen atom, a halogen atom, an alkyl group and a halogenated alkyl group and n represents an integer of 1 to 10;

$Z^{21}$ and $Z^{41}$ each independently represent —O— or —S—; and $n^{41}$ represents an integer of 1 to 10.

The third repeat unit may be represented by the following Formula 6:

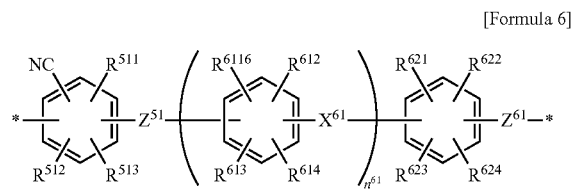

[Formula 6]

wherein $R^{511}$ to $R^{513}$, $R^{611}$ to $R^{614}$ and $R^{621}$ to $R^{624}$ each independently represent any one selected from the group consisting of: a hydrogen atom; a halogen atom; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group;

$X^{61}$ represents any divalent organic group selected from the group consisting of a single bond, —CO—, —SO$_2$—, —CONH—, —COO—, —CR'$_2$—, —(CH$_2$)$_n$—, a cyclohexylidene group, a fluorenylidene group, —C(CH$_3$)$_2$—, —C(CF$_3$)$_2$—, —O— and —S—, in which R' represents any one selected from the group consisting of a hydrogen atom, a halogen atom, an alkyl group and a halogenated alkyl group and n represents an integer of 1 to 10;

$Z^{51}$ and $Z^{61}$ each independently —O— or —S—; and $n^{61}$ represents an integer of 1 to 10.

The ion conductor may include the second repeat unit or the third repeat unit in an amount of higher than 0 parts by mole and not higher than 99 parts by mole, with respect to 100 parts by mole of the first repeat unit.

The first repeat unit may include 1 to 100 units of the repeat unit represented by Formula 1, the second repeat unit may include 1 to 100 units of the repeat unit represented by Formula 2, and the third repeat unit may include 1 to 100 units of the repeat unit represented by Formula 5.

The ion conductor may further include a repeat unit represented by the following Formula 8:

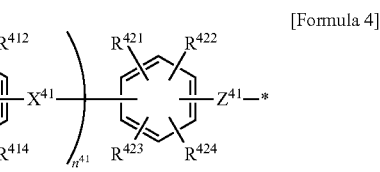

[Formula 8]

wherein Y represents a divalent nitrogen-containing aromatic ring group and Z represents —O— or —S—.

The divalent nitrogen-containing aromatic ring group may be a divalent group of nitrogen-containing aromatic ring compound selected from the group consisting of pyrrole, triazole, isothiazole, oxazole, isooxazole, imidazole, imidazoline, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine and indoline.

The ion conductor may include a first repeat unit including the repeat unit represented by Formula 1, and the repeat unit represented by Formula 2 or the repeat unit represented by Formula 5, and a second repeat unit.

The ion conductor may include hydrophilic regions including the first repeat unit, and hydrophobic regions including the second repeat unit or the third repeat unit.

The first repeat unit may include at least one ion-conducting group.

A molar ratio of the hydrophilic regions to the hydrophobic regions in the ion conductor may be 1:0.5 to 1:10.

In another aspect of the present invention, provided is a method for producing an ion conductor including preparing a repeat unit represented by the following Formula 1, preparing a repeat unit represented by the following Formula 2 or a repeat unit represented by the following Formula 5, and subjecting the repeat unit represented by Formula 1, and the repeat unit represented by Formula 2 or the repeat unit represented by Formula 5 to nucleophilic substitution reaction to produce the ion conductor.

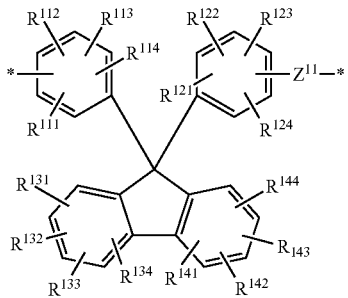

[Formula 1]

wherein $R^{111}$ to $R^{114}$, $R^{121}$ to $R^{124}$, $R^{131}$ to $R^{134}$ and $R^{141}$ to $R^{144}$ each independently represent any one selected from the group consisting of: a hydrogen atom; a halogen atom; an ion-conducting group; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group; and $Z^{11}$ represents —O— or —S—,

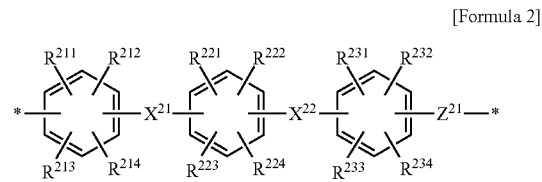

[Formula 2]

wherein $R^{211}$ to $R^{214}$, $R^{221}$ to $R^{224}$ and $R^{231}$ to $R^{234}$ each independently represent any one selected from the group consisting of: a hydrogen atom; a halogen atom; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group;

$X^{21}$ and $X^{22}$ each independently represent any one divalent organic group selected from the group consisting of a single bond, —CO—, —SO$_2$—, —CONH—, —COO—, —CR'$_2$—, —C(CH$_3$)$_2$—, —C(CF$_3$)$_2$— and —(CH$_2$)$_n$—, in which R' each independently represents any one selected from the group consisting of a hydrogen atom, a halogen atom, an alkyl group and a halogenated alkyl group, and n represents an integer of 1 to 10; and $Z^{21}$ represents —O— or —S—,

[Formula 5]

wherein $R^{511}$ to $R^{513}$ each independently represent any one selected from the group consisting of: a hydrogen atom; a halogen atom; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group; and $Z^{51}$ is —O— or —S—.

In another aspect of the present invention, provided is an ion exchange membrane including the ion conductor.

The ion exchange membrane may include a porous support including nanofibers integrated in the form of a nonwoven fabric including a plurality of pores, and the ion conductor filling pores of the porous support.

In another aspect of the present invention, provided is a membrane-electrode assembly including an anode and a cathode which face each other, and the ion exchange membrane disposed between the anode and the cathode.

In another aspect of the present invention, provided is a fuel cell including the membrane-electrode assembly.

Effects of the Invention

The ion conductor according to the present invention contains a hydrocarbon-based block copolymer which has an easily changeable structure because it includes a hydrophilic region and a hydrophobic region, so that characteristics of the block copolymer and the ion conductor can be easily regulated through control over the structure of the hydrophilic region and the hydrophobic region, and ion conductivity and durability of the ion conductor are improved within the whole humidity range through microphase separation between the hydrophilic region and the hydrophobic region which are structurally controlled.

DESCRIPTION OF DRAWINGS

The above and other objects, features and other advantages of the present invention will be more clearly understood from the following detailed description taken in conjunction with the accompanying drawings, in which:

FIG. 1 is a schematic sectional view illustrating a membrane-electrode assembly according to an embodiment of the present invention;

FIG. 2 shows nuclear magnetic resonance data of the ion conductor produced in Example 1-1 according to the present invention; and FIG. 3 shows nuclear magnetic resonance data of the ion conductor produced in Example 1-4 according to the present invention.

BEST MODE

Hereinafter, embodiments according to the present invention will be described in detail to such an extent that a person having ordinary knowledge in the art field to which the invention pertains can easily implement the invention. However, the present invention can be realized in various forms and is not limited to embodiments stated herein.

Unless otherwise specified herein, an alkyl group includes a primary alkyl group, a secondary alkyl group and a tertiary alkyl group and means a linear or branched alkyl group having 1 to 10 carbon atoms, a halogenated alkyl group means a linear or branched halogenated alkyl group having 1 to 10 carbon atoms, an allyl group means an allyl group having 2 to 10 carbon atoms, and an aryl group means an aryl group having 6 to 30 carbon atoms, an alkoxy group means an alkoxy group having 1 to 10 carbon atoms, an alkyl sulfonyl group means an alkyl sulfonyl group having 1 to 10 carbon atoms, an acyl group means an acyl group having 1 to 10 carbon atoms, and an aldehyde group means an aldehyde group having 1 to 10 carbon atoms.

Unless otherwise specified herein, an amino group includes a primary amino group, a secondary amino group and a tertiary amino group, and the secondary amino group and the tertiary amino group are amino groups having 1 to 10 carbon atoms.

Unless otherwise specified herein, all compounds or substituents may be substituted or unsubstituted. As used herein, the term "substituted" means that a hydrogen is replaced by any one selected from the group consisting of a halogen atom, a hydroxyl group, a carboxyl group, a cyano group, a nitro group, an amino group, a thio group, a methylthio group, an alkoxy group, a nitrile group, an aldehyde group, an epoxy group, an ether group, an ester group, an ester group, a carbonyl group, an acetal group, a ketone group, an alkyl group, a perfluoroalkyl group, a cycloalkyl group, a heterocycloalkyl group, an allyl group, a benzyl group, an aryl group, a heteroaryl group, a derivative thereof, and a combination thereof.

The symbol "★" on both ends of a formula in this specification means the formula is connected to an adjacent formula.

The ion conductor including a repeat unit represented by one general formula may include a repeat unit represented by one kind of formula included in the general formula as well as repeat units represented by several kinds of formulas included in the general formula.

The ion conductor according to one embodiment includes a repeat unit including the repeat unit represented by Formula 1, and a repeat unit including the repeat unit represented by Formula 2 or a repeat unit including the repeat unit represented by Formula 5.

The ion conductor may include a first repeat unit including the repeat unit represented by Formula 1, and a second repeat unit including the repeat unit represented by Formula 2.

[Formula 1]

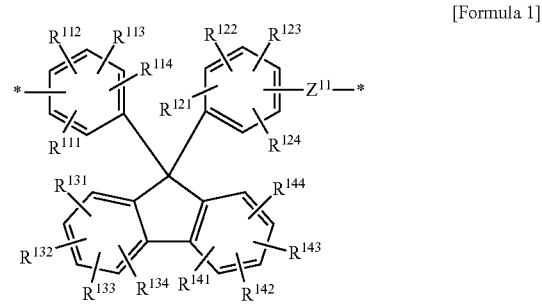

wherein $R^{111}$ to $R^{114}$, $R^{121}$ to $R^{124}$, $R^{131}$ to $R^{134}$, $R^{141}$ to $R^{144}$, $R^{311}$ to $R^{314}$ and $R^{321}$ to $R^{324}$ each independently represent any one selected from the group consisting of a hydrogen atom, a halogen atom, an ion-conducting group, an electron donation group and an electron withdrawing group.

The halogen atom may be any one selected from the group consisting of bromine, fluorine and chlorine.

The ion-conducting group includes any one cation-conducting group selected from the group consisting of a sulfonic acid group, a carboxylic acid group and a phosphoric acid group, and is preferably a sulfonic acid group. In addition, the ion-conducting group may be an anion-conducting group such as an amine group.

In addition, the electron donation group is an organic group which donates an electron and includes any one selected from the group consisting of an alkyl group, an allyl group, an aryl group, an amino group, a hydroxyl group and an alkoxy group, and the electron withdrawing group includes any one selected from the group consisting of an alkyl sulfonyl group, an acyl group, a halogenated alkyl group, an aldehyde group, a nitro group, a nitroso group and a nitrile group.

The alkyl group may be a methyl group, an ethyl group, a propyl group, a butyl group, an isobutyl group, an amyl group, a hexyl group, a cyclohexyl group, an octyl group or the like, the halogenated alkyl group may be a trifluoromethyl group, a pentafluoroethyl group, a perfluoropropyl group, a perfluorobutyl group, a perfluoropentyl group, a perfluorohexyl group or the like, the allyl group may be a propenyl group or the like, and the aryl group may be a phenyl group, a pentafluorophenyl group or the like. The perfluoroalkyl group means an alkyl group in which a part or the entirety of the hydrogen atoms is substituted by fluoro.

$Z^{11}$ represents a divalent organic group and may be —O— or —S—, preferably —O—.

[Formula 2]

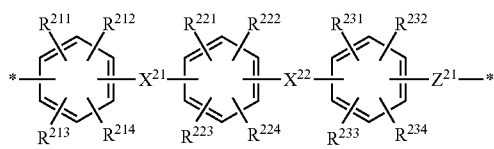

wherein $R^{211}$ to $R^{214}$, $R^{221}$ to $R^{224}$, and $R^{231}$ to $R^{234}$ each independently represent any one selected from the group consisting of: a hydrogen atom; a halogen atom; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group. Detailed explanations of the substituents have been given as above and are thus omitted.

$X^{21}$ and $X^{22}$ each independently represent a single bond or a divalent organic group. The divalent organic group is a divalent organic group which donates or withdraws an electron and is specifically selected from the group consisting of a single bond, —CO—, —SO$_2$—, —CONH—, —COO—, —CR'$_2$—, —C(CH$_3$)$_2$—, —C(CF$_3$)$_2$— and —(CH$_2$)$_n$—, in which R' represents any one selected from the group consisting of a hydrogen atom, a halogen atom, an alkyl group and a halogenated alkyl group, and n represents an integer of 1 to 10.

When $X^{21}$ or $X^{22}$ is a single bond, the phenyl groups present at both sides of X are directly connected and the representative example thereof is a biphenyl group.

$Z^{21}$ represents a divalent organic group and may be —O— or —S—, preferably —O—.

Specifically, the first repeat unit may be represented by the following Formula 3:

wherein $R^{111}$ to $R^{114}$, $R^{121}$ to $R^{124}$, $R^{131}$ to $R^{134}$, $R^{141}$ to $R^{144}$, $R^{311}$ to $R^{314}$ and $R^{321}$ to $R^{324}$ each independently represent any one selected from the group consisting of: a hydrogen atom; a halogen atom; an ion-conducting group; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group. Detailed explanations of the substituents have been given as above and are thus omitted.

$X^{31}$ represents any divalent organic group selected from the group consisting of a single bond, —CO—, —SO$_2$—, —CONH—, —COO—, —CR'$_2$—, —(CH$_2$)$_n$—, a cyclohexylidene group, a cyclohexylidene group including an ion-conducting group, a fluorenylidene group, a fluorenylidene group including an ion-conducting group, —C(CH$_3$)$_2$—, —C(CF$_3$)$_2$—, —O— and —S—, in which R' represents any one selected from the group consisting of a hydrogen atom, a halogen atom, an alkyl group and a halogenated alkyl group, and n represents an integer of 1 to 10. Detailed explanations of the substituents have been given as above and are thus omitted.

The cyclohexylidene group including an ion-conducting group, or the fluorenylidene group including an ion-conducting group means a cyclohexylidene group or a fluorenylidene group, hydrogen of which is substituted by any one ion conducting group selected from a sulfonic acid group, a carboxylic acid group, a phosphoric acid group and a combination thereof.

$Z^{11}$ and $Z^{31}$ each independently represent a divalent organic group and may be —O— or —S—, preferably —O—.

$n^{31}$ represents an integer of 0 to 10, preferably an integer of 0 or 1.

In addition, specifically, the second repeat unit may be represented by the following Formula 4:

[Formula 3]

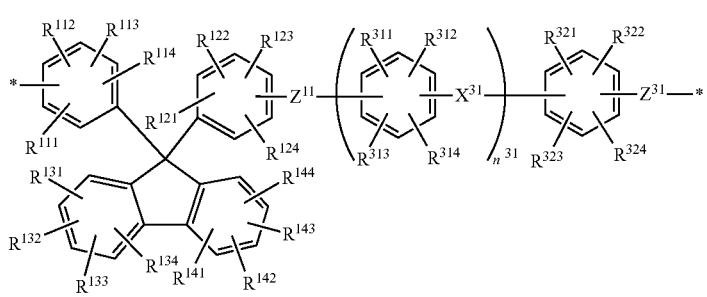

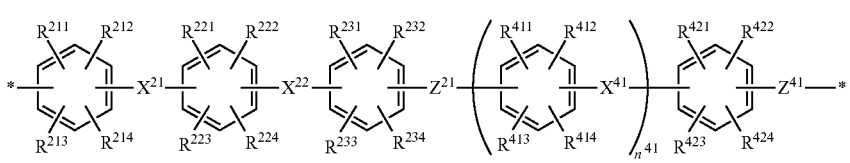

[Formula 4]

wherein $R^{211}$ to $R^{214}$, $R^{221}$ to $R^{224}$, $R^{231}$ to $R^{234}$, $R^{411}$ to $R^{414}$ and $R^{421}$ to $R^{424}$ each independently represent any one selected from the group consisting of: a hydrogen atom; a halogen atom; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group. Detailed explanations of the substituents have been given as above and are thus omitted.

$X^{21}$ and $X^{22}$ each independently represent any one divalent organic group selected from the group consisting of a single bond, —CO—, —SO$_2$—, —CONH—, —COO—, —CR'$_2$—, —C(CH$_3$)$_2$—, —C(CF$_3$)$_2$— and —(CH$_2$)$_n$—, and $X^{41}$ represents any one divalent organic group selected from the group consisting of a single bond, —CO—, —SO$_2$—, —CONH—, —COO—, —CR'$_2$—, —(CH$_2$)$_n$—, a cyclohexylidene group, a fluorenylidene group, —C(CH$_3$)$_2$—, —C(CF$_3$)$_2$—, —O— and —S—, in which R' represents any one selected from the group consisting of a hydrogen atom, a halogen atom, an alkyl group and a halogenated alkyl group, and n represents an integer of 1 to 10. Detailed explanations of the substituents have been given as above and are thus omitted.

$Z^{21}$ and $Z^{41}$ each independently represent a divalent organic group and may be —O— or —S—, preferably —O—.

$n^{41}$ represents an integer of 0 to 10, preferably an integer of 0 or 1.

Meanwhile, the ion conductor includes a first repeat unit including the repeat unit represented by Formula 1 and a third repeat unit including the repeat unit represented by Formula 5:

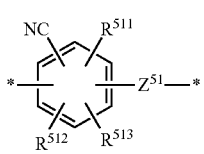

[Formula 5]

wherein $R^{511}$ to $R^{513}$ each independently represent any one selected from the group consisting of: a hydrogen atom; a halogen atom; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group. Detailed explanations of the substituents have been given as above and are thus omitted.

$Z^{51}$ is a divalent organic group and may be —O— or —S—, preferably —O—.

Specifically, the third repeat unit may be represented by the following Formula 6:

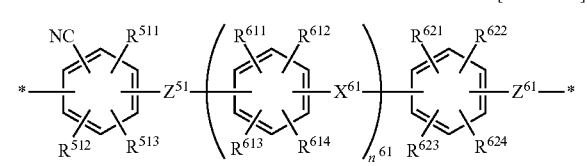

[Formula 6]

wherein $R^{511}$ to $R^{513}$, $R^{611}$ to $R^{614}$ and $R^{621}$ to $R^{624}$ each independently represent any one selected from the group consisting of: a hydrogen atom; a halogen atom; an electron donation group selected from the group consisting of an alkyl group, an allyl group, an aryl group, an amino group, a hydroxyl group and an alkoxy group; and an electron withdrawing group selected from the group consisting of an alkyl sulfonyl group, an acyl group, a halogenated alkyl group, an aldehyde group, a nitro group, a nitroso group and a nitrile group. Detailed explanations of the substituents have been given as above and are thus omitted.

$X^{61}$ represents any one divalent organic group selected from the group consisting of a single bond, —CO—, —SO$_2$—, —CONH—, —COO—, —CR'$_2$—, —(CH$_2$)$_n$—, a cyclohexylidene group, a fluorenylidene group, —C(CH$_3$)$_2$—, —C(CF$_3$)$_2$—, —O— and —S—, R' represents any one selected from the group consisting of a hydrogen atom, a halogen atom, an alkyl group and a halogenated alkyl group, and n represents an integer of 1 to 10. Detailed explanations of the substituents have been given as above and are thus omitted.

$Z^{51}$ and $Z^{61}$ each independently represent a divalent organic group and may be —O— or —S—, preferably —O—.

$n^{61}$ may be an integer of 0 to 10, preferably an integer of 0 or 1.

Meanwhile, the ion conductor may further include a repeat unit represented by the following Formula 8.

When the ion conductor further includes the repeat unit represented by the following Formula 8, the ion conductor includes a nitrogen-containing aromatic ring group on the main chain thereof and thus improves durability to radical attack and acid-base interaction. Accordingly, the ion exchange membrane can prevent a phenomenon in which an addition reaction occurs on an aromatic ring of the polymer electrolyte membrane or the aromatic ring is broken by attack from radicals formed on the cathode during operation of a fuel cell, and can maximize functions of the ionic-conducting group and thereby enhance fuel cell operation functions under low-humidity conditions.

$$*\!-\![\!-\!Y\!-\!Z\!-\!]\!-\!*$$ [Formula 8]

Z is —O— or —S—, preferably —O—.

Y represents a divalent nitrogen-containing aromatic ring group. The nitrogen-containing aromatic ring group means an aromatic ring that includes at least one nitrogen atom as a heteroatom. In addition, the nitrogen-containing aromatic ring group may include an oxygen atom, a sulfur atom or the like as another heteroatom, in addition to the nitrogen atom.

Specifically, the divalent nitrogen-containing aromatic ring group may be a divalent group of any one nitrogen-containing aromatic ring compound selected from the group consisting of pyrrole, triazole, isothiazole, oxazole, isoox-azole, imidazole, imidazoline, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine and indoline.

The ion conductor may include the second repeat unit or the third repeat unit in an amount of higher than 0 parts by mole and not higher than 99 parts by mole, preferably, 50 to 85 parts by mole, with respect to 100 parts by mole of the first repeat unit. When the second repeat unit or the third repeat unit is present in an amount of less than 50 parts by mole, dimensional stability and durability may be deteriorated due to increased water content, and when the second repeat unit or the third repeat unit is present in an amount of exceeding 85 parts by mole, no matter how large the hydrophilic region is, ion conductivity may be deteriorated.

In addition, each of the first repeat units of the ion conductor may include 1 to 100 units, preferably 5 to 20 units, of the repeat unit represented by Formula 1. In addition, each of the second repeat units of the ion conductor may include 1 to 100 units, preferably 5 to 40 units, of the repeat unit represented by Formula 2. In addition, each of the third repeat units of the ion conductor may include 1 to 100 units, preferably 5 to 40 units, of the repeat unit represented by Formula 5. When the number of the repeat units represented by Formula 1, which each of the first repeat units includes, is less than one, or the number of the repeat units represented by Formula 2, which each of the second repeat units includes, is less than one, or the number of the repeat units represented by Formula 2, which each of the third repeat units includes, is less than one, phase separation between the hydrophilic region and the hydrophobic region is insufficient, and when the numbers thereof are higher than 100, it is difficult to control the molecular weight, and solution preparation and impregnation may be deteriorated in the process of producing the reinforced membrane.

Meanwhile, the ion conductor may include a first repeat unit which includes the repeat unit represented by Formula 1, and the repeat unit represented by Formula 2 or the repeat unit represented by Formula 5, and a second repeat unit. In this case, any repeat unit may be used as the second repeat unit without limitation so long as it is generally used for ion conductors.

The ion conductor may be a block polymer which includes blocks including the first repeat unit and blocks including the second repeat unit, or a block polymer which blocks including the first repeat unit and blocks including the third repeat unit. In this case, the block polymer may be phase-separated into hydrophilic regions including the first repeat unit and hydrophobic regions including the second repeat unit or the third repeat unit.

A molar ratio of repeat units of the hydrophilic region to repeat units of the hydrophobic region in the ion conductor may be 1:0.5 to 1:10, preferably 1:1 to 1:5, more preferably 1:1.25 to 1:5. When the molar ratio of the repeat units of the hydrophobic region is less than 0.5, dimensional stability and durability may be deteriorated due to increased water content, and when the molar ratio exceeds 10, no matter how large the hydrophilic region is, ion conductivity may be deteriorated.

In this case, in order for the block including the first repeat unit to become a hydrophilic region, with regard to the repeat unit represented by Formula 1 or the repeat unit represented by Formula 3, at least one of $R^{111}$ to $R^{114}$, $R^{121}$ to $R^{124}$, $R^{131}$ to $R^{134}$, $R^{141}$ to $R^{144}$, $R^{311}$ to $R^{314}$ and $R^{321}$ to $R^{324}$ may be an ion conducting group.

In addition, in order for the block including the second repeat unit to become a hydrophobic region, with regard to the repeat unit represented by Formula 2 or the repeat unit represented by Formula 4, $R^{211}$ to $R^{214}$, $R^{221}$ to $R^{224}$, $R^{231}$ to $R^{234}$, $R^{411}$ to $R^{414}$ and $R^{421}$ to $R^{424}$ preferably substantially include an ion conducting group. The expression "substantially preferably include an ion conducting group" means that the substituents may include a small amount of ion conducting group, wherein the number of ion conducting groups is set not to impede phase separation between the hydrophilic region and the hydrophobic region.

In addition, in order for the block including the third repeat unit to be a hydrophobic region, with regard to the repeat unit represented by Formula 5 or the repeat unit represented by Formula 6, $R^{511}$ to $R^{513}$, $R^{611}$ to $R^{614}$ and $R^{621}$ to $R^{624}$ may substantially not include an ion conducting group.

Meanwhile, although the ion conductor may be the block polymer, as described above, it may be a random polymer where the first repeat unit and the second repeat unit or the third repeat unit are randomly alternately arranged. In this case, in the repeat unit represented by Formula 3, at least one of $R^{311}$ to $R^{314}$ and $R^{321}$ to $R^{324}$ may be an ion conducting group, and $R^{111}$ to $R^{114}$, $R^{121}$ to $R^{124}$, $R^{131}$ to $R^{134}$ and $R^{141}$ to $R^{144}$ may not be an ion conducting group. On the other hand, in case of the block polymer, in the repeat unit represented by Formula 3, at least one of $R^{111}$ to $R^{114}$, $R^{121}$ to $R^{124}$, $R^{131}$ to $R^{134}$ and $R^{141}$ to $R^{144}$ may be an ion conducting group, and $R^{311}$ to $R^{314}$ and $R^{321}$ to $R^{324}$ may not be an ion conducting group, but the present invention is not limited thereto. Regardless of the type of polymer, i.e., whether the polymer is a random or block polymer, only at least one of $R^{111}$ to $R^{114}$, $R^{121}$ to $R^{124}$, $R^{131}$ to $R^{134}$ and $R^{141}$ to $R^{144}$ may be an ion conducting group, or only at least one of $R^{311}$ to $R^{314}$ and $R^{321}$ to $R^{324}$ may be an ion conducting group, or both thereof may be an ion conducting group.

The ion conductor may have a weight average molecular weight of 10,000 g/mol to 1,000,000 g/mol, preferably 100,000 g/mol to 500,000 g/mol. When the weight average molecular weight of the ion conductor is less than 100,000 g/mol, it is difficult to form a uniform film and durability is deteriorated. When the weight average molecular weight of the ion conductor is higher than 500,000 g/mol, solubility may be decreased.

In another aspect of the present invention, the ion conductor may be produced by the following steps including preparing a repeat unit represented by the following Formula 1, preparing a repeat unit represented by the following Formula 2 or a repeat unit represented by the following Formula 5, and producing the ion conductor through nucleophilic substitution reaction between the repeat unit represented by Formula 1, and the repeat unit represented by Formula 2 or the repeat unit represented by Formula 3.

The step of producing the repeat unit represented by Formula 1, the repeat unit represented by Formula 2 and the repeat unit represented by Formula 3 may be carried out by nucleophilic substitution reaction. For example, in case where the repeat unit represented by Formula 1 is the repeat unit represented by Formula 3, it can be produced by aromatic nucleophilic substitution reaction between two ingredients, i.e., an active dihalide monomer and a dihydroxide monomer, constituting the repeat unit represented by Formula 3, and in case where the second repeat unit is the repeat unit represented by Formula 4, it can be produced by aromatic nucleophilic substitution reaction between two ingredients, i.e., the active dihalide monomer and the dihydroxide monomer, constituting the repeat unit represented by Formula 4.

For example, in case where the repeat unit represented by Formula 1 is the repeat unit represented by Formula 3, it can be produced by nucleophilic substitution reaction between, as the active dihalide monomer, sulfonated dichlorodiphenyl sulfone (SDCDPS), sulfonated difluorodiphenyl sulfone (SDFDPS), sulfonated dichlorodiphenyl ketone (SDCDPK), dichlorodiphenyl sulfone (DCDPS), difluorodiphenyl sulfone or bis-(4-fluorophenyl)-sulfone (DFDPS), dichlorodiphenyl ketone (DCDPK) or the like, and as the active dihydroxy monomer, sulfonated 9,9'-bis(4-hydroxyphenyl)fluorine (or sulfonated 4,4'-(9-fluorenylidene biphenol, SHPF) or 9,9'-bis(4-hydroxyphenyl)fluorine (or 4,4'-(9-fluorenylidene biphenol, HPF) or the like.

In addition, in case where the repeat unit represented by Formula 2 is the repeat unit represented by Formula 4, it can be produced by nucleophilic substitution reaction between 1,3-bis(4-fluorobenzoyl)benzene or the like as the active dihalide monomer, and dihydroxydiphenyl sulfone (DHDPS), dihydroxydiphenyl ketone (or dihydroxybenzophenone, DHDPK) or 4,4'-biphenol (BP) as the active dihydroxy monomer.

In addition, in case where the repeat unit represented by Formula 3 is the repeat unit represented by Formula 6, it can be produced by nucleophilic substitution reaction between, as the active dihalide monomer, 2,6-difluorobenzonitrile or the like, and as the active dihydroxy monomer, dihydroxydiphenyl sulfone (DHDPS), dihydroxydiphenyl ketone (or dihydroxybenzophenone, DHDPK), 4,4'-biphenol (BP) or the like.

Similarly, when nucleophilic substitution reaction between the repeat unit represented by Formula 1 and the repeat unit represented by Formula 2 or the repeat unit represented by Formula 3 is performed as well, by setting two ends of the repeat unit represented by Formula 1 to hydroxyl groups and setting two ends of the repeat unit represented by Formula 2 or the repeat unit represented by Formula 3 to halide groups, or by setting two ends of the repeat unit represented by Formula 2 or the repeat unit represented by Formula 3 to hydroxyl groups and setting two ends of the repeat unit represented by Formula 1 to halide groups, the repeat unit represented by Formula 1 and the repeat unit represented by Formula 2 or the repeat unit represented by Formula 3 can be subjected to nucleophilic substitution reaction.

In this case, the nucleophilic substitution reaction is preferably carried out in the presence of an alkaline compound. The alkaline compound may be specifically sodium hydroxide, potassium hydroxide, sodium carbonate, potassium carbonate, sodium hydrogen carbonate or the like. These compounds may be used alone or as a mixture thereof.

In addition, the nucleophilic substitution reaction may be carried out in the presence of a solvent. In this case, specifically, examples of the solvent include aprotic polar solvents such as N,N-dimethyl acetamide, N,N-dimethyl formamide, N-methyl-2-pyrrolidone, dimethyl sulfoxide, sulfolane, and 1,3-dimethyl-2-imidazolidinone. These solvents may be used alone or as a mixture thereof.

In this case, a solvent such as benzene, toluene, xylene, hexane, cyclohexane, octane, chlorobenzene, dioxane, tetrahydrofuran, anisole, or phenetole may be present in combination with the aprotic polar solvent.

Optionally, the method of producing the ion conductor may further include incorporating an ion conducting group into the ion conductor. For example, in case where the ion conducting group is a sulfonic acid group as a cation conducting group, the step of introducing the ion conducting group into the ion conductor may be exemplified by the following methods.

First, there is a method of introducing the ion conducting group into a polymer which is obtained by polymerization of a monomer including an ion conducting group, when producing the first repeat unit constituting the hydrophilic region of the ion conductor. In this case, as the monomer of the nucleophilic substitution reaction, sulfonated dichlorodiphenyl sulfone (SDCDPS), sulfonated difluorodiphenyl sulfone (SDFDPS), sulfonated dichlorodiphenyl ketone (SDCDPK), sulfonated 9,9'-bis(4-hydroxyphenyl)fluorine (or sulfonated 4,4'-(9-fluorenylidene biphenol, SHPF) or the like which includes an ion conducting group may be used.

In addition, in this case, after a polymer having a sulfonic acid ester group is produced by reacting a monomer which has the sulfonic acid ester group, instead of the sulfonic acid group, the sulfonic acid ester group can be converted into a sulfonic acid group through deesterification of the sulfonic acid ester group.

Second, after a polymer is produced using a monomer which does not include an ion conducting group, an ion conducting group can be introduced into the repeat unit represented by Formula 1 through sulfonation using a sulfonation agent.

The sulfonation agent may be sulfuric acid, but in another example, an ion conductor having the ability to conduct hydrogen ions can be produced by reaction of the prepared polymer in a chlorinated solvent such as dichloromethane, chloroform or 1,2-dichloroethane in the presence of excess chlorosulfonic acid (1 to 10 times, preferably 4 to 7 times of the total weight of the polymer).

In case where the ion conductor includes a sulfonic acid group as an ion conducting group, the ion conductor may have a sulfonation degree of 1 to 100 mol %, preferably 50 to 100 mol %. That is, the ion conductor may be sulfonated in an amount of 100 mol % in a site to be sulfonated. Even if sulfonation is carried out to an extent of 100 mol %, there are effects of preventing deterioration in dimensional stability and durability due to the structure of the block polymer of the ion conductor. In addition, when the ion conductor has a sulfonation within the range defined above, excellent ion conductivity can be secured without deterioration in dimensional stability.

In another aspect, the present invention is directed to an ion exchange membrane including the ion conductor.

The ion exchange membrane may be classified into a proton exchange membrane or an anion exchange membrane depending on the type of ion conducting group.

In addition, the ion exchange membrane may be applicable as a polymer electrolyte membrane for fuel cells, or as an ion exchange membrane for water electrolysis, water treatment, secondary batteries and the like.

The ion exchange membrane may be a single membrane or a reinforced membrane which includes the ion conductor supported by a porous support.

In case where the ion exchange membrane is a reinforced membrane, the ion exchange membrane may include a porous support in which nanofibers are integrated in the form of a non-woven fabric including a plurality of pores, and the ion conductor filling the pores of the porous support.

Regarding the ion exchange membrane, the porous support improves mechanical strength of the ion exchange membrane and inhibits volume expansion by moisture, thereby serving to enhance dimensional stability.

The ion conductor may be present in an amount of 50 to 99% by weight, with respect to the total weight of the ion exchange membrane. When the content of the ion conductor is less than 50% by weight, the ion conductivity of the ion exchange membrane may be deteriorated and when the content of the ion conductor is higher than 99% by weight, the mechanical strength and dimensional stability of the ion exchange membrane may be deteriorated.

The porous support has a structure in which nanofibers are integrated in the form of a non-woven fabric including a plurality of pores and the porous support is preferably an assembly of polymer nanofibers in which the nanofibers produced by electrospinning are three-dimensionally irregularly and discontinuously arranged.

The porous support may include any one selected from the group consisting of nylon, polyimide, polyaramide, polyether imide, polyacrylonitrile, polyaniline, polyethylene oxide, polyethylene naphthalate, polybutylene terephthalate, styrene butadiene rubber, polystyrene, polyvinyl chloride, polyvinyl alcohol, polyvinylidene fluoride, polyvinyl butylene, polyurethane, polybenzoxazole, polybenzimidazole, polyamide-imide, polyethylene terephthalate, polyethylene, polypropylene, a copolymer thereof and a mixture thereof. Of these, polyimide which exhibits relatively better heat resistance, chemical resistance and shape stability is preferably included.

The porous support may be produced as a structure in which nanofibers are integrated in the form of a non-woven fabric including a plurality of pores, using electrospinning, electro-blown spinning, centrifugal spinning, melt blowing or the like, preferably, electrospinning.

In another aspect, the present invention is directed to a membrane-electrode assembly for fuel cells including the ion exchange membrane and a fuel cell including the same.

Specifically, the membrane-electrode assembly includes an anode and a cathode which face each other, and the ion exchange membrane disposed between the anode and the cathode.

FIG. 1 is a sectional view schematically illustrating a membrane-electrode assembly according to an embodiment of the present invention. Referring to FIG. 1, the membrane-electrode assembly 100 according to the present embodiment includes an ion exchange membrane 50, and electrodes 20 and 20' for fuel cells disposed respectively on both surfaces of the ion exchange membrane 50. The electrodes 20 and 20' include electrode substrates 40 and 40' and catalyst layers 30 and 30' formed on surfaces of the electrode substrates, respectively, and may further include a microporous layer (not shown) containing fine conductive particles such as carbon powder or carbon black in order to facilitate substance diffusion between the electrode substrates 40 and 40' and the catalyst layers 30 and 30'.

In the membrane-electrode assembly 100, the electrode that is disposed on one surface of the ion exchange membrane 50 and induces oxidation to produce hydrogen ions and electrons from a fuel which passes through the electrode substrate 40 and is transported to the catalyst layer 30, is referred to as an anode and the electrode 20', that is disposed on the other surface of the ion exchange membrane 50 and induces reduction to produce water from hydrogen ions supplied through the ion exchange membrane 50 and an oxidizing agent which passes through the electrode substrate 40' and is transported to the catalyst layer 30', is referred to as a cathode.

The catalyst layers 30 and 30' of the anode and the cathode 20 and 20' include a catalyst. Any catalyst may be used so long as it participates in reactions of fuel cells and is commonly used as a catalyst for fuel cells. Specifically, the catalyst may be a platinum-based catalyst and examples of the platinum-based catalyst include platinum, ruthenium, osmium, platinum-ruthenium alloys, platinum-osmium alloys, platinum-palladium alloys and platinum-M alloys (wherein M represents at least one transition metal selected from the group consisting of Ga, Ti, V, Cr, Mn, Fe, Co, Ni, Cu, Zn, Sn, Mo, W and Rh). More specifically, the platinum-based catalyst may include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni and Pt/Ru/Sn/W. The catalyst may be used as a catalyst (black) alone, or may be supported on a support medium upon use. Examples of the support medium include carbon-based substances such as graphite, Denka black, Ketjen black, acetylene black, carbon nanotubes, carbon nanofibers, carbon nanowires, carbon nanoballs and activated carbon, and inorganic particulates such as alumina, silica, zirconia and titania particulates.

In addition, the catalyst layers 30 and 30' may further include a binder resin to improve adhesion between the catalyst layer and the ion exchange membrane, and transfer hydrogen ions. The binder resin may be the same as the ion conductor used for production of the ion exchange membrane.

The electrode substrates 40 and 40' may be porous conductive substrates to facilitate supply of hydrogen or oxygen. Representative examples of the porous conductive substrate include carbon paper, carbon cloth, carbon felt and metal cloth (a porous film composed of fibrous metal cloth or a metal film formed on the surface of cloth made of polymer fibers), but the present invention is not limited thereto. In addition, preferably, the electrode substrates and 40' may be subjected to waterproofing with a fluorine-based resin so as to prevent deterioration in diffusion efficiency of reactants caused by water generated during operation of fuel cells. The fluorine-based resin may be polytetrafluoroethylene, polyvinylidene fluoride, polyhexafluoropropylene, polyperfluoroalkyl vinyl ether, polyperfluorosulfonyl fluoride alkoxyvinyl ether, fluorinated ethylene propylene, polychlorotrifluoroethylene or a copolymer thereof.

The membrane-electrode assembly 100 may be produced by an ordinary method of producing a membrane-electrode assembly for fuel cells, except that the ion exchange membrane according to the present invention is used as the ion exchange membrane 50.

In another aspect, the present invention is directed to a fuel cell including the membrane-electrode assembly 100.

Specifically, the fuel cell includes at least one electricity generator for generating electricity through oxidization reaction of a fuel and reduction reaction of an oxidizing agent, a fuel supply for supplying the fuel to the electricity generator, and an oxidizing agent supply for supplying the oxidizing agent such as oxygen or air to the electricity generator, wherein the electricity generator includes the membrane-electrode assembly 100 and a separator for supplying the fuel and the oxidizing agent to both sides of the membrane-electrode assembly 100. The fuel used herein may be a gas or liquid hydrogen and/or hydrocarbon fuel and representative examples of the hydrocarbon fuel include methanol, ethanol, propanol, butanol and natural gas.

The separator, the fuel supply and the oxidizing agent supply are those used for general fuel cells, except that the membrane-electrode assembly 100 according to the embodiment of the present invention is used for the fuel cell, and a detailed description thereof will thus be omitted.

MODE FOR INVENTION

Hereinafter, embodiments will be described in detail so that the embodiments can be easily implemented by a person who has ordinary knowledge in the field to which the present invention pertains. The present invention may be embodied in many different forms and should not be construed as being limited to the embodiments set forth herein.

Preparation Example 1: Preparation of Ion Conductor

Example 1-1

1) Preparation of Second Repeat Unit

As depicted in the following Reaction Scheme 1, bisphenol A was reacted with 1,3-bis(4-fluorobenzoyl)benzene in the presence of potassium carbonate using a DMAc/toluene co-solvent at 160 to 180° C. for 30 hours, and the reaction product was then discharged in purified water and washed, and was hot air-dried. At this time, Carother's equation was used to control the polymerization degree of oligomer.

[Reaction Scheme 1]

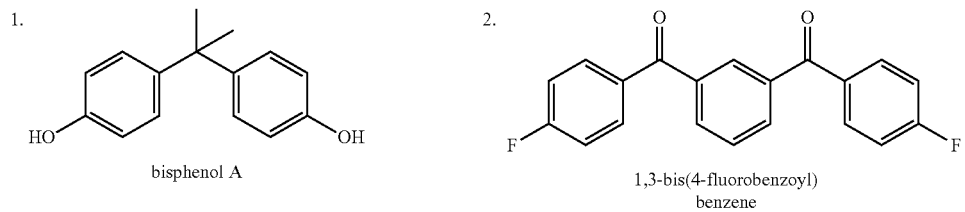

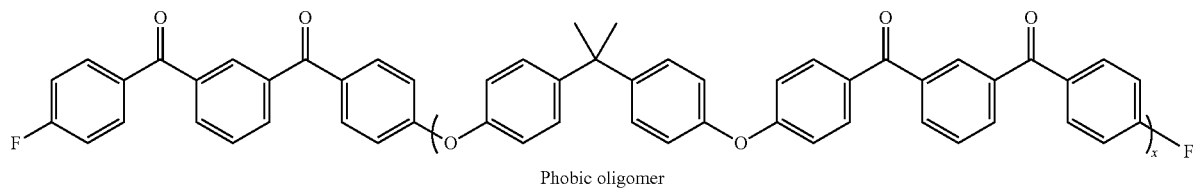
Phobic oligomer

2) Preparation of First Repeat Unit

As depicted in the following Reaction Scheme 2, 4,4'-(9-fluorenylidene)diphenol was reacted with bis(4-fluorophenyl)sulfone in the presence of potassium carbonate using a DMAc/toluene co-solvent at 160 to 180° C. for 30 hours, and the reaction product was then discharged in purified water and washed, and was hot air-dried. At this time, Carother's equation was used to control the polymerization degree of oligomer.

[Reaction Scheme 2]

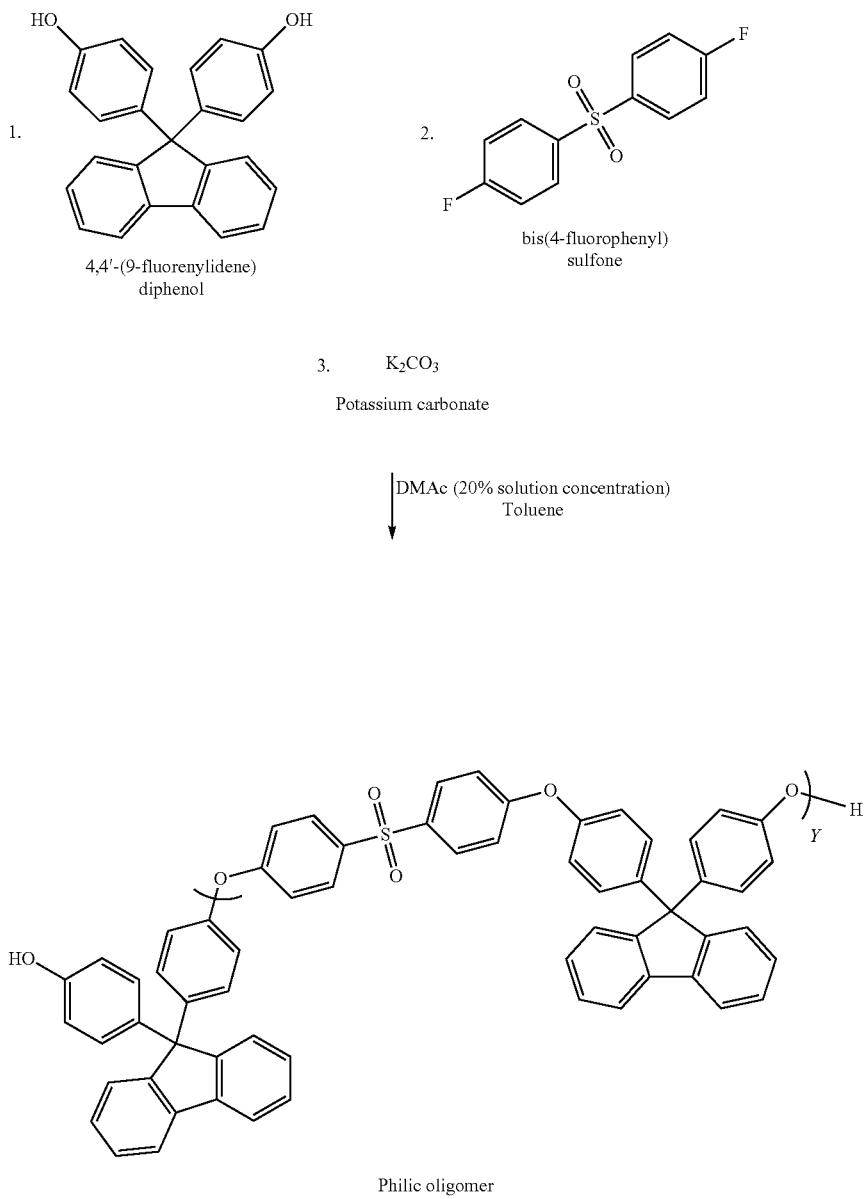

3) Preparation of Polymer

The prepared first and second repeat units were reacted in the presence of potassium carbonate using a DMAc/toluene co-solvent at 160 to 180° C. for 30 hours, and the reaction product was then discharged in purified water and washed, and was hot air-dried. A molar ratio of the hydrophilic region (Y) to the hydrophobic region (X) of the prepared polymer was 1:1.25.

4) Preparation of Ion Conductor

The prepared polymer was dissolved in dichloromethane and slowly added to a 5-fold excess of chlorosulfonic acid/DCM solution and stirred for 24 hours. The solution was removed and the precipitated solid was washed with purified water and then hot air-dried.

The nuclear magnetic resonance data of the ion conductor produced in Example 1-1 is shown in FIG. 2.

Example 1-2

An ion conductor was prepared in the same manner as in Example 1-1, except that the molar ratio of the hydrophilic region to the hydrophobic region was changed to 1:2.5.

Example 1-3

1) Preparation of Third Repeat Unit

As depicted in the following Reaction Scheme 3, 4,4'-dihydroxybenzophenone was reacted with 2,6-difluorobenzonitrile in the presence of potassium carbonate using a DMAc/toluene co-solvent at 160 to 180° C. for 30 hours, and the reaction product was then discharged in purified water and washed, and was hot air-dried. At this time, Carother's equation was used to control the polymerization degree of oligomer.

[Reaction Scheme 3]

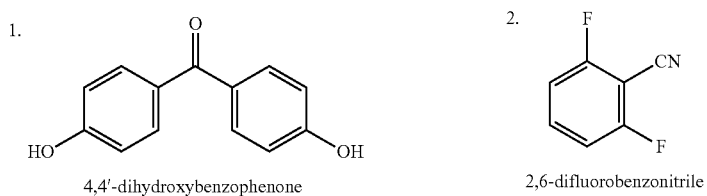

1. 4,4'-dihydroxybenzophenone
2. 2,6-difluorobenzonitrile
3. K$_2$CO$_3$
Molecular Weight: 138.21
Potassium carbonate DMAc (20% solution concentration)
Toluene

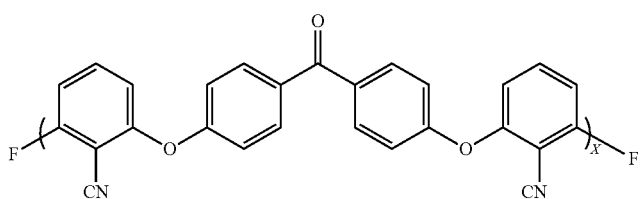

2) Preparation of First Repeat Unit

As depicted in the following Reaction Scheme 4, 4,4'-(9-fluorenylidene)diphenol was reacted with bis(4-fluorophenyl)sulfone in the presence of potassium carbonate using a DMAc/toluene co-solvent at 160 to 180° C. for 30 hours, and the reaction product was discharged in purified water and washed, and was hot air-dried. At this time, Carother's equation was used to control the polymerization degree of oligomer.

[Reaction Scheme 4]

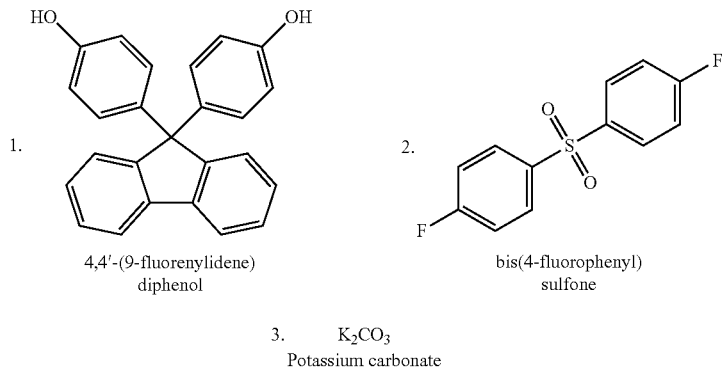

1. 4,4'-(9-fluorenylidene) diphenol
2. bis(4-fluorophenyl) sulfone
3. K$_2$CO$_3$
Potassium carbonate DMAc (20% solution concentration)
Toluene

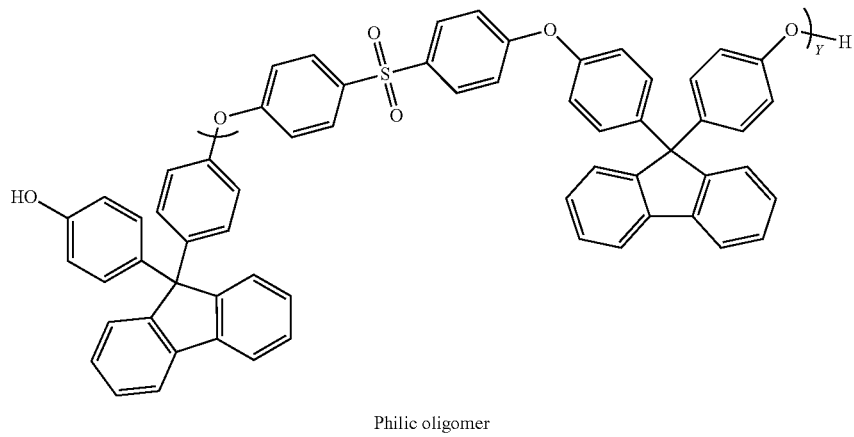

Philic oligomer

3) Preparation of Polymer

The prepared first and third repeat units were reacted in the presence of potassium carbonate using a DMAc/toluene co-solvent at 160 to 180° C. for 30 hours, and the reaction product was then discharged in purified water and washed, and was hot air-dried. A molar ratio of the hydrophilic region (Y) to the hydrophobic region (X) of the prepared polymer was 1:2.5.

4) Preparation of Ion Conductor

The prepared polymer was dissolved in dichloromethane and slowly added to a 5-fold excess of chlorosulfonic acid/DCM solution and stirred for 24 hours. The solution was removed and the precipitated solid was washed with purified water and then hot air-dried.

Example 1-4

1) Preparation of Second Repeat Unit 4,4'-dihydroxybenzophenone was reacted with bis(4-fluorophenyl)sulfone in the presence of potassium carbonate using a DMAc/toluene co-solvent at 160 to 180° C. for 30 hours, and the reaction product was then discharged in purified water and washed, and was hot air-dried. At this time, Carother's equation was used to control the polymerization degree of oligomer.

2) Preparation of First Repeat Unit 4,4'-(9-fluorenylidene)diphenol was reacted with 1,3-bis(4-fluorobenzoyl)benzene in the presence of potassium carbonate using a DMAc/toluene co-solvent at 160 to 180° C. for 30 hours, and the reaction product was then discharged in purified water and washed, and was hot air-dried. At this time, Carother's equation was used to control the polymerization degree of oligomer.

3) Preparation of Polymer

The prepared first and second repeat units were reacted in the presence of potassium carbonate using a DMAc/toluene co-solvent at 160 to 180° C. for 30 hours, and the reaction product was then discharged in purified water and washed, and was hot air-dried. A molar ratio of the hydrophilic region (Y) to the hydrophobic region (X) of the prepared polymer was 1:2.3.

4) Preparation of Ion Conductor

The prepared polymer was dissolved in dichloromethane and slowly added to a 5-fold excess of chlorosulfonic acid/DCM solution and stirred for 24 hours. The solution was removed and the precipitated solid was washed with purified water and then hot air-dried.

The structure of the ion conductor produced in Example 1-4 is shown in Formula 7 and the nuclear magnetic resonance data of the ion conductor is shown in FIG. 3.

[Formula 7]

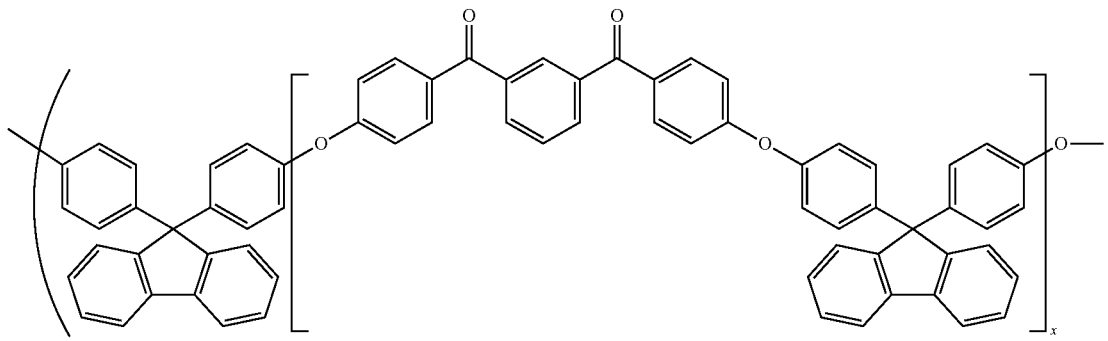

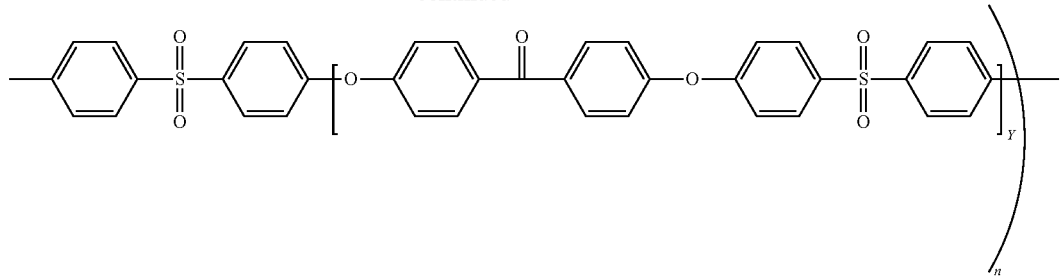

Comparative Example 1-1

1) Preparation of First Repeat Unit

As depicted in the following Reaction Scheme 5, 4,4'-(9-fluorenylidene)diphenol was reacted with bis(4-fluorophenyl)sulfone in the presence of potassium carbonate using a DMAc/toluene co-solvent at 160 to 180° C. for 30 hours, and the reaction product was then discharged in purified water and washed, and was hot air-dried. At this time, Carother's equation was used to control the polymerization degree of oligomer.

2) Preparation of Second Repeat Unit

As depicted in the following Reaction Scheme 6, 4,4'-dihydroxybenzophenone was reacted with bis(4-fluorophenyl)sulfone in the presence of potassium carbonate using a DMAc/toluene co-solvent at 160 to 180° C. for 30 hours, and the reaction product was then discharged in purified water and washed, and was hot air-dried. At this time, Carother's equation was used to control the polymerization degree of oligomer.

[Reaction Scheme 5]

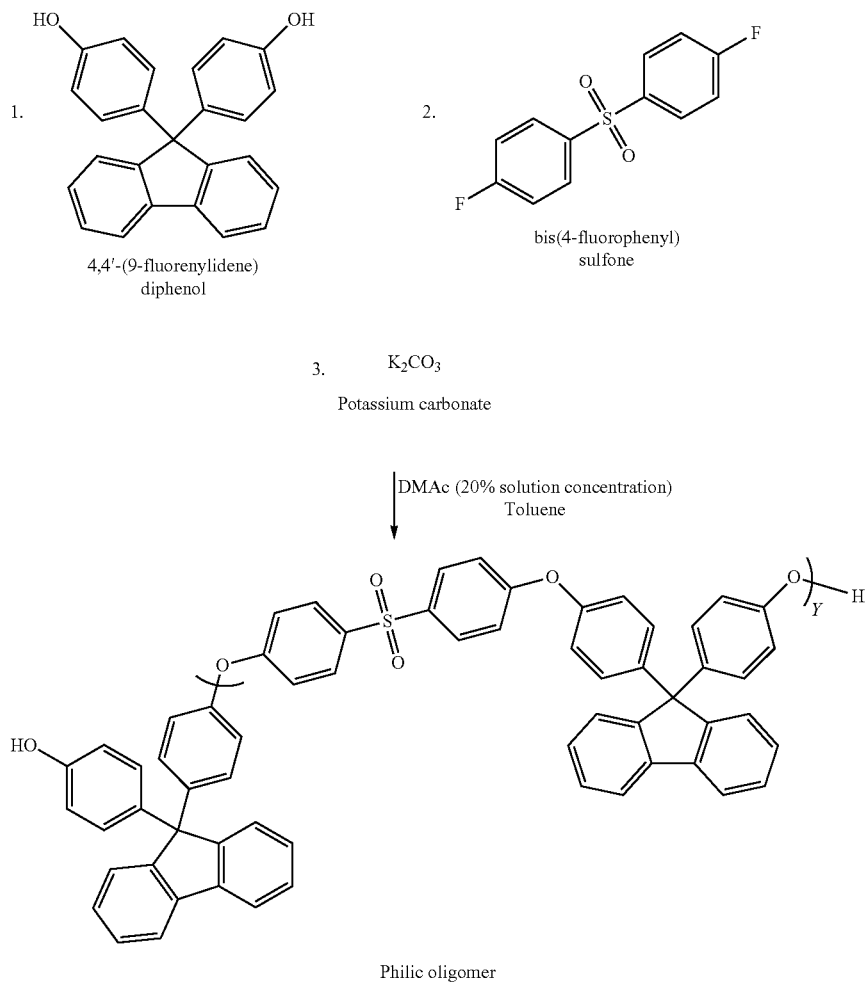

[Reaction Scheme 6]

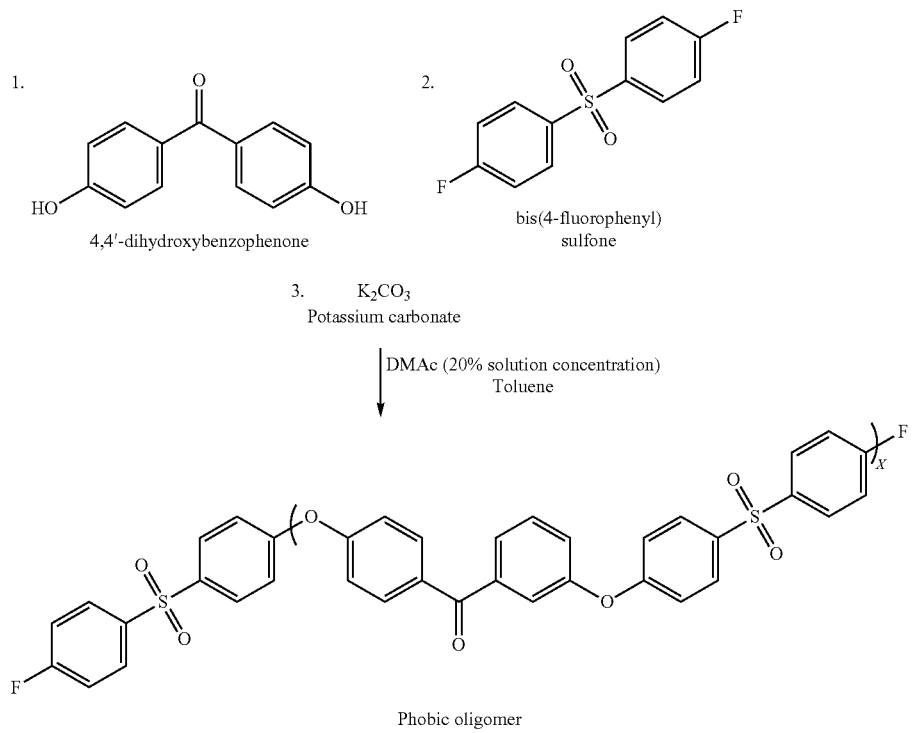

Phobic oligomer

3) Preparation of Polymer

The prepared first and second repeat units were reacted in the presence of potassium carbonate using a DMAc/toluene co-solvent at 160 to 180° C. for 30 hours, and the reaction product was then discharged in purified water and washed, and was hot air-dried. A molar ratio of the hydrophilic region (Y) to the hydrophobic region (X) of the prepared polymer was 1:2.5.

4) Preparation of Ion Conductor

The prepared polymer was dissolved in dichloromethane and slowly added to a 5-fold excess of chlorosulfonic acid/DCM solution and stirred for 24 hours. The solution was removed and the precipitated solid was washed with purified water and then hot air-dried.

Preparation Example 2: Production of Ion Exchange Membrane in the Form of Single Membrane Examples 2-1 to 2-4

The ion conductors produced in Examples 1-1 to 1-4 were dissolved in DMAc at a concentration of 20 wt % to form membranes, thereby producing ion exchange membranes in the form of single membranes.

Comparative Example 2-1

The ion conductor produced in Comparative Example 1-1 was dissolved in DMAc at a concentration of 20 wt % to form a membrane, thereby producing an ion exchange membrane in the form of a single membrane.

Preparation Example 3: Production of Ion Exchange Membrane in the Form of Reinforced Membrane Example 3-1

Polyamic acid was dissolved in dimethylformamide to prepare 5 L of a spinning solution having a viscosity of 480 poise. The prepared spinning solution was transferred to a solution tank, fed by a volumetric gear pump to a spinning chamber having 20 nozzles and to which a high voltage of 3 kV was applied and then spun to produce a web for a nanofiber precursor. At this time, the amount of the supplied solution was 1.5 ml/min and the web for a nanofiber precursor was thermally treated at 350° C. to produce a porous support (porosity: 40% by volume).

The produced porous support was impregnated twice for minutes in an ion conductor solution prepared by dissolving the ion conductor prepared in Example 1-1 in DMAc at 20% by weight, was allowed to stand under a reduced pressure for one hour and then dried under vacuum at 80° C. for 10 hours to produce an ion exchange membrane. In this case, the weight per unit area of polyimide nanofibers was 6.8 gsm and the weight of the ion conductor was 65 mg/cm$^2$.

Examples 3-2 and 3-4

An ion exchange membrane was produced in the form of a reinforced membrane in the same manner as in Example 3-1, except that the ion conductors prepared in Examples 1-2 to 1-4 were used, instead of the ion conductor prepared in Example 1-1.

Comparative Example 3-1

An ion exchange membrane was produced in the form of a reinforced membrane in the same manner as in Example 3-1, except that the ion conductor prepared in Comparative Example 1-1 was used, instead of the ion conductor prepared in Example 3-1.

Test Example: Measurement of Properties of Ion Exchange Membrane

Test Example 1

The ion exchange capacity (IEC) of ion exchange membranes produced in Examples 2-1 to 2-3 and Comparative Example 2-1 was evaluated by neutralization titration. In addition, ion conductivity was measured under conditions of 80° C. and relative humidity of 95%, conditions of 80° C. and relative humidity of 50% and conditions of 80° C. and relative humidity of 30%. Results are shown in the following Table 1.

TABLE 1

|  | Example 2-1 | Example 2-2 | Example 2-3 | Comparative Example 2-1 |
|---|---|---|---|---|
| Hydrophilic:hydrophobic (molar ratio) | 1:1.25 | 1:2.5 | 1:2.5 | 1:2.5 |
| IEC (meq/g) | 2.5 | 1.8 | 2.0 | 1.9 |
| Ion conductivity (80° C., 95 RH %) | 0.500 | 0.300 | 0.030 | 0.280 |
| Ion conductivity (80° C., 50 RH %) | 0.080 | 0.052 | 0.050 | 0.030 |
| Ion conductivity (80° C., 30 RH %) | 0.030 | 0.018 | 0.015 | 0.008 |

As can be seen from Table 1, the ion exchange membranes produced in examples include an ion conductor that includes a hydrocarbon-based block polymer which consists of hydrophilic regions and hydrophobic regions and thus has an easily changeable structure, and characteristics of the block copolymer and the ion conductor can be easily regulated through control over the structure of the hydrophilic region and the hydrophobic region, and ion conductivity and durability of the ion conductor are improved within the whole humidity range through micro-phase separation between the hydrophilic region and the hydrophobic region which are structurally controlled.

In addition, the ion exchange membrane produced in Example 2-1 exhibits high water content and serious swelling, compared to the ion exchange membrane produced in Example 2-2, and shows improvement in ion conductivity within the entire humidity range, in particular, within a low humidity range, compared to the ion exchange membrane produced in Comparative Example 2-1.

Test Example 2

The ion conductor was produced by changing the molar ratio of the hydrophilic region and the hydrophobic region of the ion conductor in Example 1-1, as shown in Table 2, and ion exchange membranes in the form of a single membrane and a reinforced membrane, respectively, were produced using the produced ion conductor in the same manner as in Examples 2-1 and 3-1.

The ion conductivity of the ion exchange membranes produced in the form of a single membrane and a reinforced membrane were measured under the conditions of 80° C. and a relative humidity of 95% and under the conditions of 80° C. and relative humidity of 50%. Results are shown in the following Table 2.

TABLE 2

| Example 1-1 | Single membrane | | Reinforced membrane | |
|---|---|---|---|---|
| Hydrophilic:hydrophobic (molar ratio) | Ion conductivity (80° C., 95 RH %) | Ion conductivity (80° C., 50 RH %) | Ion conductivity (80° C., 95 RH %) | Ion conductivity (80° C., 50 RH %) |
| 1:1.8 (12:21) | 0.410 | 0.039 | 0.295 | 0.027 |
| 1:2.3 (10:23) | 0.280 | 0.033 | 0.210 | 0.022 |
| 1:2.5 (10:25) | 0.259 | 0.031 | 0.191 | 0.021 |
| 1:2.7 (12:32) | 0.243 | 0.024 | 0.170 | 0.019 |
| 1:3.4 (9:30) | 0.195 | 0.025 | 0.140 | 0.018 |
| 1:4.2 (9:37) | 0.161 | 0.021 | 0.120 | 0.015 |
| 1:4.7 (7:33) | 0.105 | 0.016 | 0.090 | 0.010 |
| 1:2.5 (6:15) | 0.159 | 0.017 | n/a | n/a |
| 1:2.5 (8:19) | 0.174 | 0.019 | n/a | n/a |
| 1:2.5 (10:25) | 0.259 | 0.031 | 0.191 | 0.021 |
| 1:2.3 (14:34) | 0.260 | 0.031 | n/a | n/a |

As can be seen from Table 2, the ion conductivity of the ion conductor was changed depending on the molar ratio of repeat units of the hydrophilic region to repeat units of the hydrophobic region, and the numbers of repeat units of the hydrophilic region and the hydrophobic region.

Test Example 3

The ion conductor was produced by changing the molar ratio of the hydrophilic region and hydrophobic region of the ion conductor in Example 1-4, as shown in Table 3, and ion exchange membranes were produced in the form of a single membrane and a reinforced membrane using the produced ion conductor in the same manner as in Examples 2-1 and 3-1, respectively.

The ion conductivity of the ion exchange membranes produced in the form of a single membrane and a reinforced membrane was measured under the conditions of 80° C. and a relative humidity of 95% and under the conditions of 80° C. and relative humidity of 50%. Results are shown in the following Table 3.

TABLE 3

| Example 1-4 | Single membrane | |
|---|---|---|
| Hydrophilic:hydrophobic (molar ratio) | Ion conductivity (80° C., 95 RH %) | Ion conductivity (80° C., 50 RH %) |
| (13:24) | 0.256 | 0.023 |
| (14:31) | 0.208 | 0.019 |
| (9:25) | 0.168 | 0.015 |
| (9:28) | 0.138 | 0.012 |
| (5:13) | 0.197 | 0.016 |

As can be seen from Table 3, the ion conductivity of the ion conductor was changed depending on the molar ratio of repeat units of the hydrophilic region and repeat units of the hydrophobic region and the numbers of repeat units of the hydrophilic region and the hydrophobic region.

Although the preferred embodiments of the present invention have been disclosed for illustrative purposes, those skilled in the art will appropriate that various modifications, additions and substitutions are possible, without departing from the scope and spirit of the invention as disclosed in the accompanying claims.

DESCRIPTION OF REFERENCE NUMERALS

20, 20': Electrodes
30, 30': Catalyst layers

40, 40': Electrode substrates
50: Ion exchange membrane
100: Membrane-electrode assembly

INDUSTRIAL APPLICABILITY

The present invention relates to an ion conductor, a method for producing the same, and an ion exchange membrane, a polymer electrolyte membrane and a fuel cell including the same. The ion conductor contains a hydrocarbon-based block copolymer which includes a hydrophilic region and a hydrophobic region, and thereby has an easily changeable structure, wherein characteristics of the block copolymer and the ion conductor can be easily regulated through control over the structure of the hydrophilic region and the hydrophobic region, and ion conductivity and durability of the ion conductor are improved within the whole humidity range through micro-phase separation between the hydrophilic region and the hydrophobic region which are structurally controlled.

The invention claimed is:
1. An ion conductor comprising a hydrophilic region and a hydrophobic region, wherein:
the hydrophilic region is a region formed by a sulfonation of a first segment represented by the following Formula A1 or A2, wherein Y is an integer of 5 to 40; and
the hydrophobic region includes a second segment represented by any one of the following Formulas B1, B2, and B3, wherein X is an integer of 5 to 40:

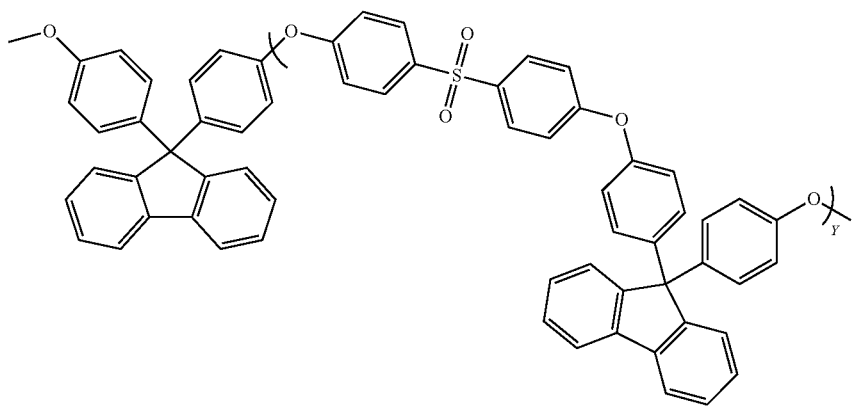

Formula A1

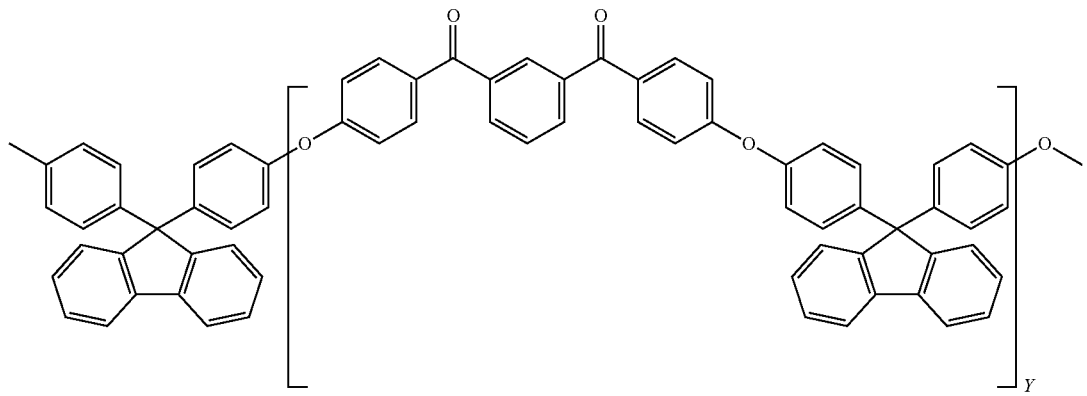

Formula A2

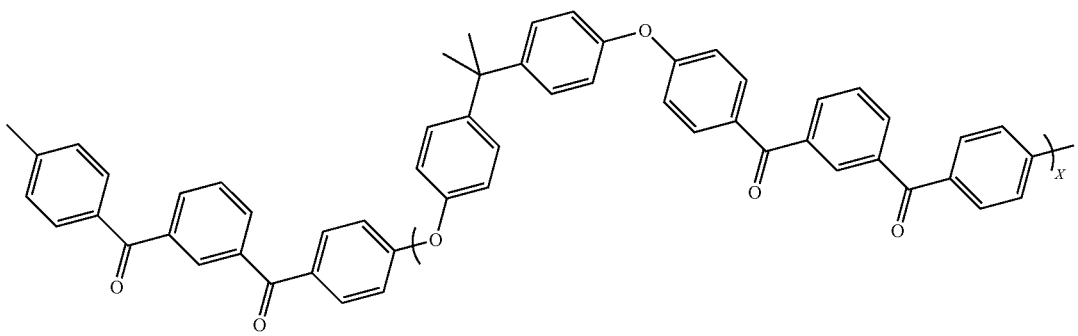

Formula B1

-continued

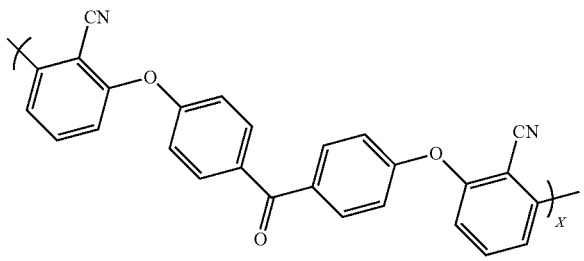

Formula B2

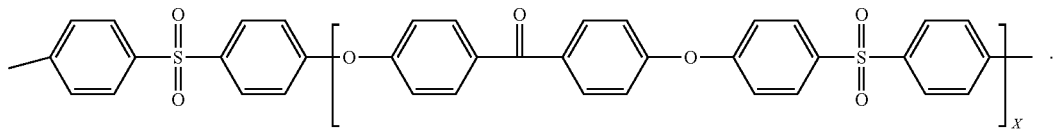

Formula B3

2. The ion conductor according to claim 1, wherein a molar ratio of a repeat unit of the first segment to a repeat unit of the second segment (Y:X) is 1:1.25 to 1:2.5.

3. The ion conductor according to claim 1, wherein the first segment is sulfonated in a sulfonation degree of 50 to 100 mol % to form the hydrophilic region.

4. An ion conductor comprising::
a repeat unit represented by the following Formula 1; and
a repeat unit represented by the following Formula 2 or a repeat unit represented by the following Formula 5:

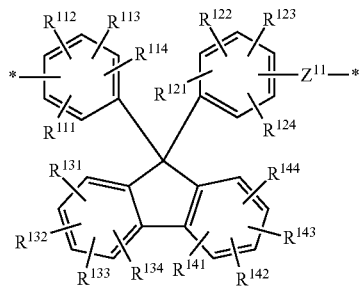

[Formula 1]

wherein $R^{111}$ to $R^{114}$, $R^{121}$ to $R^{124}$, $R^{131}$ to $R^{134}$, and $R^{141}$ to $R^{144}$ each independently represent any one selected from the group consisting of: a hydrogen atom; a halogen atom; an ion-conducting group; an electron donation group selected from the group consisting of an alkyl group, an allyl group, an aryl group, an amino group, a hydroxyl group, and an alkoxy group; and an electron withdrawing group selected from the group consisting of an alkyl sulfonyl group, an acyl group, a halogenated alkyl group, an aldehyde group, a nitro group, a nitroso group, and a nitrile group; and
$Z^{11}$ represents —O— or —S—,

[Formula 2]

$$*\!\!-\!\!\underset{R^{213}\ R^{214}}{\overset{R^{211}\ R^{212}}{\bigcirc}}\!\!-\!\!X^{21}\!\!-\!\!\underset{R^{223}\ R^{224}}{\overset{R^{221}\ R^{222}}{\bigcirc}}\!\!-\!\!X^{22}\!\!-\!\!\underset{R^{233}\ R^{234}}{\overset{R^{231}\ R^{232}}{\bigcirc}}\!\!-\!\!Z^{21}\!\!-\!\!*$$

wherein $R^{211}$ to $R^{214}$, $R^{221}$ to $R^{224}$, and $R^{231}$ to $R^{234}$ each independently represent any one selected from the group consisting of: a hydrogen atom: a halogen atom; an electron donation group selected from the group consisting of an alkyl group, an allyl group, an aryl group, an amino group, a hydroxyl group, and an alkoxy group; and an electron withdrawing group selected from the group consisting of an alkyl sulfonyl group, an acyl group, a halogenated alkyl group, an aldehyde group, a nitro group, a nitroso group, and a nitrile group;
$X^{21}$ and $X^{22}$ each independently represent any one divalent organic group selected from the group consisting of a single bond, —CO—, —SO$_2$—, —CONH—, —COO—, —CR'$_2$—, —C(CH$_3$)$_2$—, C(CF$_3$)$_2$—, and —(CH$_2$)$_n$—, in which R' each independently represents any one selected from the group consisting of a hydrogen atom, a halogen atom, an alkyl group, and a halogenated alkyl group, and n represents an integer of 1 to 10; and
$Z^{21}$ represents —O— or —S—,

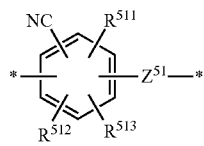

[Formula 5]

wherein $R^{511}$ to $R^{513}$ each independently represent any one selected from the group consisting of: a hydrogen atom;; a halogen atom; an electron donation group selected from the group consisting of an alkyl group, an allyl group, an aryl group, an amino group, a hydroxyl group, and an alkoxy group; and an electron withdrawing group selected from the group consisting of an alkyl sulfonyl group, an acyl group, a halogenated alkyl group, an aldehyde group, a nitro group, a nitroso group, and a nitrile group; and
$Z^{51}$ is —O— or —S—,
wherein the ion conductor further comprises a repeat unit represented by the following Formula 8:

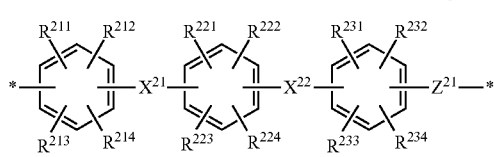

Formula 8 wherein Y represents a divalent nitrogen-containing aromatic ring group; and

Z represents —O— or —S—.

5. The ion conductor according to claim 4, wherein the divalent nitrogen-containing aromatic ring group is a divalent group of nitrogen-containing aromatic ring compound selected from the group consisting of pyrrole, thiazole, isothiazole, oxazole, isooxazole, imidazole, imidazoline, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine, and indoline.

6. A method for producing the ion conductor according to claim 1, the method comprising:

preparing a first oligomer for the first segment;

preparing a second oligomer for the second segment;

preparing a block copolymer with the first and second oligomers so that the block copolymer comprises the first and second segments; and sulfonating the first segment.

7. An ion exchange membrane comprising the ion conductor according to claim 1.

8. The ion exchange membrane according to claim 7, wherein the ion exchange membrane comprises:

a porous support including nanofibers integrated in the form of a non-woven fabric including a plurality of pores; and the ion conductor filling pores of the porous support.

9. A membrane-electrode assembly comprising:

an anode and a cathode facing each other; and the ion exchange membrane according to claim 7 disposed between the anode and the cathode.

10. A fuel cell comprising the membrane-electrode assembly according to claim 9.

* * * * *